(12) United States Patent
Dror et al.

(10) Patent No.: US 9,978,150 B2
(45) Date of Patent: May 22, 2018

(54) METHOD AND SYSTEM FOR SPATIAL SEGMENTATION OF ANATOMICAL STRUCTURES

(71) Applicant: Algotec Systems Ltd., Rochester, NY (US)

(72) Inventors: Oranit Dror, Rishon Leziyyon (IL); Guy Engelhard, Kiryat Ono (IL)

(73) Assignee: Algotec Systems Ltd., Ra'anana (IL)

( * ) Notice: Subject to any disclaimer, the term of this patent is extended or adjusted under 35 U.S.C. 154(b) by 44 days.

(21) Appl. No.: 15/162,663

(22) Filed: May 24, 2016

(65) Prior Publication Data
US 2017/0039725 A1    Feb. 9, 2017

Related U.S. Application Data

(60) Provisional application No. 62/201,147, filed on Aug. 5, 2015.

(51) Int. Cl.
*G06K 9/00*  (2006.01)
*G06T 7/12*  (2017.01)

(52) U.S. Cl.
CPC ...... *G06T 7/12* (2017.01); *G06T 2207/10081* (2013.01); *G06T 2207/20156* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 2007/0217668 A1* | 9/2007 | Bornemann | ............ | G06K 9/00 382/132 |
| 2008/0292169 A1* | 11/2008 | Wang | .................... | G06T 7/0012 382/131 |
| 2012/0070068 A1* | 3/2012 | Pal | ........................ | G06T 17/00 382/154 |

OTHER PUBLICATIONS

E.A. Eisenhauer et al., "New Response Evaluation Criteria In Solid Tumors: Revised RECIST Guideline (version 1.1)", European Jounral of Cancer, 45, 2009, pp. 228-247.
L.H. Schwartz et al., "Evaluation of Lymph Nodes With RECIST 1.1", European Journal of Cancer, 45, 2009, pp. 261-267.
J.A. Sethian, "Level Set Methods and Fast Marching Methods: Evolving Interfaces In Computational Geometry, Fluid Mechanics, Computer Vision, and Materials Science", Cambridge University Press, Cambridge, UK, 2003 (excerpt only).
P. Perona et al., "Scale-Space and Edge Detection Using Anisotropic Diffusion", IEEE Transactions on Pattern Analysis and Machine Intelligence, vol. 12, No. 7, 1990, pp. 629-639.
D. Adalsteinsson et al., "A Fast Level Set Method for Propagating Interfaces", Journal of Computational Physics, vol. 118, No. 2, 1995, pp. 269-277.

(Continued)

*Primary Examiner* — Atiba O Fitzpatrick

(57) ABSTRACT

Spatial segmentation of lymph nodes in a 3-D medical image is automatically determined, based on a set of inputs provided by a user which define a low number of initial conditions for segmentation. In some embodiments, the automation comprises producing a lymph node segmentation from the 3-D image based on a 2-D image slice and a representative line segment on that slice. In some embodiments, segmentation comprises a two tiered approach (2-D segmentation, followed by 3-D segmentation) based on adaptation of the level set framework to the particular conditions of lymph node segmentation.

20 Claims, 11 Drawing Sheets

(56) References Cited

OTHER PUBLICATIONS

R.T. Whitaker, "A Level-Set Approach to 3D Reconstruction From Range Data", International Journal of Computer Vision, vol. 29, Issue 3, 1998, pp. 203-231.
R. Malladi et al., "Shape Modeling With Front Propagation: A Level Set Approach", IEEE Transactions on Pattern Analysis and Machine Intelligence, vol. 17, No. 2, 1995, pp. 158-175.
A.E. Lefohn et al., "A Streaming Narrow-Band Algorithm: Interactive Computation and Visualization of Level Sets", IEEE Transactions on Visualization and Computer Graphics, vol. 10, No. 4, 2004, pp. 422-433.

* cited by examiner

METHOD AND SYSTEM FOR SPATIAL SEGMENTATION OF ANATOMICAL STRUCTURES

CROSS REFERENCE TO RELATED APPLICATIONS

This application claims the benefit of U.S. Provisional application U.S. Ser. No. 62/201,147 provisionally filed on Aug. 5, 2015, entitled METHOD AND SYSTEM FOR SPATIAL SEGMENTATION OF ANATOMICAL STRUCTURES in the name of Dror et al, which is incorporated herein by reference in entirety.

FIELD AND BACKGROUND

The present invention, in some embodiments thereof, relates to the field of medical image data segmentation, and more particularly, to semi-automatic spatial segmentation of anatomical structures including, for example: lymph nodes, cysts, tumors, nodules and/or other lesions on three-dimensional (3D) medical image data.

Lymph nodes, in particular, are bean-shaped organs that play a critical role in the proper functioning of the immune system. They are widely distributed throughout the body, with a primary function to recognize and filter out foreign substances. Lymph nodes become inflamed or enlarged under pathological conditions ranging from mild infections, such as common cold, to life-threatening diseases, such as cancers. Therefore, lymph nodes are considered routinely in clinical practice. The quantitative assessment of their size over time is crucial in monitoring disease progress and treatment effectiveness.

Lymph nodes, cysts, tumors, nodules, lesions and other anatomical structures are typically analyzed on three-dimensional (3D) medical images produced by scanning technologies such as computed tomography (CT) and magnetic resonance (MR). These allow non-invasive imaging of internal organs and tissues. Currently available scanners provide a high spatial resolution suitable for accurate size measurement. However, in current clinical routines, radiologists estimate the size of anatomical structures on medical images manually, such that a large portion of this information may go unused. For example, estimation is based on approximate measures of the longest diameter and/or the short-axis on a 2D slice; a method recommended, for example by RECIST [1-2].

Challenges of lymph node spatial segmentation and volumetric analysis include: (i) lymph nodes are found in many different tissue environments throughout the body; (ii) lymph node image intensity values overlap with other soft tissues, such as muscles and vessels; and (iii) particularly when enlarged, lymph nodes possess a variety of shapes, textures, and sizes (for example, from 5 mm up to 50 mm or more in length). In many cases, such challenges are also found in the segmentation of other soft tissue structures, in particular cysts, nodules, tumors and other lesions.

SUMMARY OF THE INVENTION

According to an aspect of some embodiments, there is provided a method of spatially segmenting an anatomical structure from 3-D medical image data, comprising: receiving the 3-D medical image data, and a plurality of grid locations from within a section of the 3-D medical data, the section including a sub-portion of the anatomical structure; determining a first seed selection, based on the grid locations and the section; determining a partial segmentation of the anatomical structure within the section, based on the first seed selection; determining a second seed selection, based on the location of the partial segmentation within the 3-D medical image data; and determining a 3-D segmentation of the anatomical structure, based on the second seed selection and the 3-D medical image data.

According to some embodiments, the sub-portion is a 2-D slice of the 3-D medical data.

According to some embodiments, the partial segmentation is a 2-D segmentation.

According to some embodiments, the anatomical structure comprises a lymph node.

According to some embodiments, the anatomical structure fills at least 90% of the convex hull enclosing the anatomical structure.

According to some embodiments, the partial segmentation comprises the boundary of the sub-portion of the anatomical structure.

According to some embodiments, the determining of the partial segmentation comprises moving a boundary of the first seed selection outward from an initial position of the first seed selection boundary.

According to some embodiments, the moving of the boundary is according to a speed function F through a level set function $\phi(p,t)$ determined based on the section.

According to some embodiments, the boundary of the first seed selection moves according to an initial value partial differential equation $\phi_t + F|\nabla\phi| = 0$.

According to some embodiments, the speed function F comprises terms for propagation, curvature, and advection.

According to some embodiments, the speed function F weights the terms for propagation, curvature, and advection in a ratio of about 0.7 to 0.15 to 0.15, respectively.

According to some embodiments, the definition of the propagation term comprises an edge-based velocity map.

According to some embodiments, the edge-based velocity map is computed based on gradient magnitudes within the section.

According to some embodiments, the definition of the propagation term comprises an intensity-based velocity map.

According to some embodiments, the intensity-based velocity map is computed based on intensity values within the section.

According to some embodiments, computation of the intensity-based velocity map comprises determination of a range of intensities within the first seed selection boundary.

According to some embodiments, the range of intensities is defined by a minimum between about 2.5 standard deviations below the mean and about the 5% order statistics of intensities within the first seed selection boundary.

According to some embodiments, the range of intensities is defined by a maximum between about 1.5 standard deviations above the mean and about the 95% order statistics of intensities within the first seed selection boundary.

According to some embodiments, the range of intensities is limited to be between −100 HU and 200 HU.

According to some embodiments, the definition of the propagation term comprises a linear combination of the intensity-based velocity map and the edge-based velocity map.

According to some embodiments, movement of the boundary is confined to be within a 2-D region of interest.

According to some embodiments, the 2-D region of interest comprises two axes defining parameters of a closed curve, each axis having a length selected so that the interior of the closed curve includes all of the lymph node appearing in the 2-D section within the 2-D region of interest.

According to some embodiments, the two axes of the 2-D region of interest define an ellipse.

According to some embodiments, the two axes of the 2-D region of interest have a ratio of between 2.5 and 4.

According to some embodiments, the two axes of the 2-D region of interest have a ratio of about 3.

According to some embodiments, the determining of a 3-D segmentation comprises moving a boundary of the second seed selection outward in three dimensions from an initial position of the second seed selection boundary.

According to some embodiments, the moving of the boundary is according to a speed function F through a level set function $\phi(p,t)$ determined based on the 3-D medical image data.

According to some embodiments, the boundary of the second seed selection moves according to an initial value partial differential equation $\phi_t + F|\nabla\phi| = 0$.

According to some embodiments, the speed function F comprises terms for propagation, curvature, and advection.

According to some embodiments, the speed function F weights the terms for propagation, curvature, and advection in a ratio of about 0.7 to 0.15 to 0.15, respectively.

According to some embodiments, the definition of the propagation term comprises an edge-based velocity map.

According to some embodiments, the edge-based velocity map is computed based on gradient magnitudes within the 3-D medical image data.

According to some embodiments, the definition of the propagation term comprises an intensity-based velocity map.

According to some embodiments, the intensity-based velocity map is computed based on intensity values within the 3-D medical image data.

According to some embodiments, computation of the intensity-based velocity map comprises determination of a range of intensities within the second seed selection boundary.

According to some embodiments, the range of intensities is defined by a minimum between about 2.5 standard deviations below the mean and about the 5% order statistics of intensities within the second seed selection boundary.

According to some embodiments, the range of intensities is defined by a maximum between about 1.5 standard deviations above the mean and about the 95% order statistics of intensities within the second seed selection boundary.

According to some embodiments, the range of intensities within the second seed selection boundary is limited to be between −100 HU and 200 HU.

According to some embodiments, the definition of the propagation term comprises a linear combination of the intensity-based velocity map and the edge-based velocity map.

According to some embodiments, movement of the boundary is confined to be within a 3-D volume of interest.

According to some embodiments, the 3-D volume of interest comprises three axes defining parameters of the volume, each having a length selected such that the volume includes all of the lymph node appearing in the 3-D medical image data.

According to some embodiments, the parameters defined by the three axes describe an ellipsoid.

According to some embodiments, two of the three axes of the 3-D volume of interest have a ratio of between 2.5 and 4, and the remaining axis has a ratio to the longest of the two axes of between 1.5 and 2.5.

According to some embodiments, two of the three axes of the 3-D volume of interest have a ratio of about 3, and the remaining axis has a ratio to the longest of the two axes of about 2.

According to some embodiments, the determining of the first seed selection comprises defining a 2-D boundary of the first seed.

According to some embodiments, the determining of the second seed selection comprises defining a 3-D boundary of the second seed.

According to some embodiments, the determining of the partial segmentation of the anatomical structure comprises refining the partial segmentation to exclude regions near the boundary based on a criterion of shape.

According to some embodiments, the determining of the 3-D segmentation of the anatomical structure comprises refining the 3-D segmentation to exclude regions near the boundary based on a criterion of shape.

According to some embodiments, the determining of the partial segmentation of the anatomical structure comprises refining the partial segmentation to exclude regions near the boundary based on a criterion of intensity in the section of the 3-D medical data.

According to some embodiments, the criterion of intensity in the section comprises limiting intensities to intensities of assumed by the anatomical structure under inspection in the 3-D medical image data.

According to some embodiments, the criterion of intensity in the section comprises limiting intensities to intensities between −100 HU and 200 HU.

According to some embodiments, the criterion of intensity in the section comprises limiting intensities to a minimum between about 0.5 standard deviations below the mean and about the 5% order statistics of intensities within the partial boundary.

According to some embodiments, the criterion of intensity in the section comprises limiting intensities to a maximum between about 1.5 standard deviations above the mean and about the 95% order statistics of intensities within the partial boundary.

According to some embodiments, the determining of the 3-D segmentation of the anatomical structure under inspection comprises refining the 3-D segmentation to exclude regions near the boundary based on a criterion of intensity in the 3-D medical image data.

According to some embodiments, the criterion of intensity in the 3-D medical image data comprises limiting intensities to intensities of assumed by the anatomical structure under inspection in the 3-D medical image data.

According to some embodiments, the criterion of intensity in the 3-D medical image data comprises limiting intensities to between −100 HU and 200 HU.

According to some embodiments, the criterion of intensity in the 3-D medical image data comprises limiting intensities to a minimum between about 0.5 standard deviations below the mean and about the 5% order statistics of intensities within the 3-D boundary.

According to some embodiments, the criterion of intensity in the 3-D medical image data comprises limiting intensities to a maximum between about 1.5 standard deviations above the mean and about the 95% order statistics of intensities within the 3-D boundary.

According to an aspect of some embodiments, there is provided a computer software product, comprising a computer-readable medium in which program instructions are stored, which instructions, when read by a computer, cause the computer to receive 3-D medical image data and execute the method described above.

According to an aspect of some embodiments, there is provided a system for spatially segmenting an anatomical structure from 3-D medical image data, comprising a CT imaging station configured to perform the method described above.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example, and for purposes of illustrative discussion of embodiments of the invention. In this regard, the description taken with the drawings makes apparent to those skilled in the art how embodiments of the invention may be practiced. In the drawings.

DESCRIPTION OF EMBODIMENTS

Figure 1A:
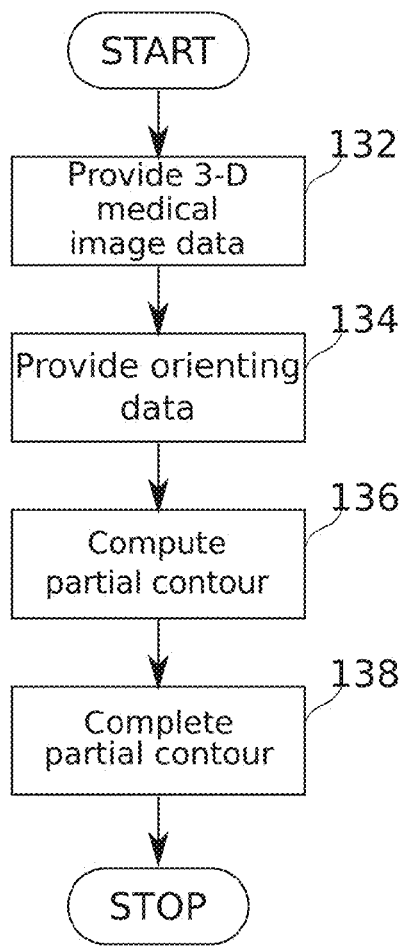
FIG. 1A is a flowchart of a method for spatially segmenting a tissue structure (for example, a tissue structure having a convex and/or compact volumetric extent) in a 3-D medical image in two stages of contour determination, according to some exemplary embodiments of the invention.

The present invention, in some embodiments thereof, relates to the field of medical image data segmentation, and more particularly, to semi-automatic spatial segmentation of anatomical structures including, for example: lymph nodes, cysts, tumors, nodules and/or lesions on three-dimensional (3D) medical image data.

An aspect of some embodiments of the invention relates to determining a spatial segmentation of nodular anatomical structures in a 3-D medical image, based on extrapolation from initial inputs that do not explicitly set the 3-D extents of the nodular structure. For purposes of illustration, many of the descriptions herein relate specifically to lymph nodes. However, it is to be understood that methods of segmentation described herein with respect to lymph nodes are also applicable to other anatomical structures, such as cysts, tumors, nodules and/or other lesions. The methods described herein are potentially of particular utility for segmentation of nodular structures, and/or structures that have a generally convex and/or compact volumetric extent.

For example, the inputs comprise locations within the 3-D extents of a lymph node that are selected based on their relationships to one another and/or to the boundaries of the lymph node. In some embodiments, the inputs comprise two grid point locations and a 2-D plane containing them, from which the 3-D segmentation is defined. Optionally, the grid point locations are on (or considered to be on) the ends of the longest diameter or the short-axis of the lymph node [1-2]. Optionally, the 2-D image slice selection is determined manually. Optionally, the two grid point locations are provided manually. While manual definition of two points and a plane provides a potential benefit by its similarity to input methods used for manual volume estimation (such as the RECIST recommendation [1-2]), it should be understood that other initial inputs are provided in some embodiments of the invention: for example three points (which define a plane among them if they are non-collinear), or even a single point, from which initial extrapolations are made in order to arrive at sufficient information to perform the segmentation as such.

In some embodiments, where a 2-D slice is selected, the 2-D slice is any slice through the 3-D data, for example a slice created as a two-dimensional multi-planar reconstruction (MPR) image. Optionally, the 2-D slice is a slice in the axial orientation of the body.

In some embodiments of the invention, the 3-D medical image data comprise CT, MRI, or another form of medical image data.

An aspect of some embodiments of the invention relates to a two-tier (two-phase) approach to expanding initial constraints into a spatial segmentation of a lymph node.

In some embodiments, a first phase comprises use of initial data (such as a representative line segment location, sub-selection of the 3-D medical image data, and/or other inputs) to estimate a seed location inside a portion of the lymph node. The seed grows outwards until it defines, by its boundaries, a partial contour (for example, a planar 2-D contour) of the lymph node. In some embodiments, a second phase comprises a spatial evolution of the partial contour of the lymph node until it reaches the 3-D boundary of the lymph node. A potential advantage of this two-phase approach is that the expansion of the first stage serves to gather and consolidate information about the lymph node beyond what is initially available; this allows the second phase of expansion to be more tightly constrained (with reduced risk of excluding lymph node portions), yet more aggressive within those constraints (with reduced risk of including regions that are not actually part of the lymph node).

An aspect of some embodiments of the invention relates to simplifying the development of a complex lower-dimension function over time by embedding it into a higher-dimension function, wherein the lower-dimension function is a segmentation and/or partial segmentation of a lymph node. In some embodiments of the invention, this is performed using the level set framework [3]. Optionally, the level set framework is used to expand an initial or "seed" contour in one or both of two phases of lymph node segmentation.

In some embodiments, the adaptation of this framework to use in the detection of lymph nodes in 3-D medical image data comprises the determination of various constraints, weights, and guiding assumptions.

For example, in some embodiments, the lymph node is considered as a generally ovoid (optionally, ellipsoid) body with a compact shape. Potentially, this allows determination of seed regions and/or limiting region of interest (ROI) and/or volume of interest (VOI) envelopes in which detection takes place, that are used within the level set framework to find the lymph node. For example, based on this assumption, the seed can be allowed to expand large enough to include a statistically useful sample of intensity/gradient grid points, predictably without violating a constraint that the seed still remains within the boundaries of the lymph node itself. Conversely, for example, a ROI or VOI is predictably sized to fully enclose a lymph node based on initial information, without expanding to the point where it ceases to be useful in preventing the indefinite expansion of the segmentation to non-lymph node portions of the image.

In some embodiments, parameters for the seed and/or ROI and/or VOI formation are chosen to allow the initial selection of the line segment and/or 2-D slice by the user to be acceptable within a relatively broad range of options. For example, the 2-D slice is selected to be a "central slice", but the slice is not necessary the most central slice.

In some embodiments, parameters that work together for determination of a lymph node spatial segmentation include but are not limited to one or more of the following:

An expected or provisionally selected "typical" maximal aspect ratio of long to short diameter of the lymph node (for example, 3:1, or another greater, lesser, or intermediate aspect ratio).

One or more parameters governing the size and shape of an initial 2-D seed ball based on a line segment, such that the seed fills (and thus samples) a significant region of a 2-D cross section (for example, about 25%, about 33%, about 50%, or another larger, smaller, or intermediate fraction)—this filling being without crossing beyond the boundaries of the lymph node itself.

One or more parameters governing the size and shape of an initial 3-D seed based on a 2-D profile of a lymph node section, such that the seed fills a significant portion of the overall lymph node volume, for example, about 10%, about 15%, about 25%, or another larger, smaller, or intermediate fraction of the total lymph node volume.

Selection of the mapping of image intensities to velocity values for expansion of the seed—for example, setting a statistical threshold based on grid points falling within the seed ball to determine one or more velocity functions for expanding the seed.

Selection of weights for combining velocity mappings and/or other terms of the expansion, such that the expansion matches the expected features of a lymph node (compact ovoid having relatively low boundary curvature), and/or is reliable within a range of image conditions (image noise, lymph node boundaries with tissues having a variety of image intensities).

Selection of parameters, such as statistically-based intensity thresholds and shape constraints, for removing segmentation "leaks" that expand across lymph node boundaries, and/or "holes" that occur within lymph node boundaries.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Spatial Segmentation

Reference is now made to FIG. 1A, which is a flowchart of a method for spatially segmenting a lymph node, cyst, tumor, nodule, lesion or other tissue structure (for example, a tissue structure having a convex and/or compact volumetric extent) in a 3-D medical image in two stages of segmentation determination, according to some exemplary embodiments of the invention.

At block 132, in some embodiments, the flowchart begins, and 3-D medical image data are provided.

At block 134, in some embodiments, orienting data are provided to the algorithm. In some embodiments, the orienting data comprise one or more selections or indications by a user that serve as a starting point for calculating the segmentation. In some embodiments, the indications comprise selection of a portion of the 3-D medical image data within which a first, partial segmentation of the tissue structure is to be calculated. The portion comprises, for example, one or a plurality of 2-D image planes (or sections thereof). Optionally, the plurality of 2-D image planes together comprises a 3-D selection from within the 3-D medical image data, i.e. a slab of adjacent slices, and/or a pair of perpendicular planes.

In some embodiments, the indications comprise one or more locations selected from within the data portion, the selection being, for example, by a user. The one or more directly selected locations comprise, for example, exactly two grid point locations within the data. Optionally, the one or more locations comprise exactly one grid point location. Alternatively, any number of locations is selected, according to the selected portion of 3-D image data and the specifics of the partial segmentation determination to be made at the next block. Optionally, the locations marked by the user are a set of grid points along the contour of the anatomical structure to be segmented, on one or more slices. Optionally, the selected set of grid points defines a ball (2-D or 3-D) inside the anatomical structure.

Optionally, the selected portion of the 3D image is determined in concern with selection of locations marked by the user. For example, a region within a slab of slices is optionally marked by a line segment within one slice, and a perpendicular segment that marks the slices in which the partial segmentation should be calculated. For a pair of perpendicular planes, the locations marked by the user can be a pair of line segments on the two planes.

At block 136, in some embodiments of the invention, a partial segmentation is computed, based on the received 3-D medical image data, and the orienting data.

In some embodiments, the determination of the partial segmentation comprises an initialization of a "seed", defined as a selection of grid points from the data that are assumed, for the purposes of the segmentation algorithm, to be contained within the anatomical structure to be segmented. The seed selection is initialized, in some embodiments, from the particulars of the orienting data provided at block 134.

Optionally—for example, if a single grid point inside the anatomical structure is marked by the user at block 134—the seed is a circle, a 3-D ball or any other subset of grid points around the marked grid point. Optionally—for example, if the user marks a pair of grid points as a line segment inside the anatomical structure (or on its boundary)—the seed is a circle, a 3-D ball or other subset of grid points around the marked line segment center. Optionally, the line segment defines the diameter of the seed.

Optionally, the partial segmentation is computed in a way that may capture part of the anatomical structure's boundary, i.e. the partial segmentation contains a partial contour of the anatomical structure. Optionally, the partial segmentation is the segmentation of the anatomical structure on one or more 2-D slices surrounded by the contour of the anatomical structure on these slices.

At block 138, in some embodiments, the partial segmentation determined from block 136 becomes the basis on which a second seed is constructed for determination of the full segmentation of the anatomical structure ("completing the partial segmentation"). Construction of the second seed potentially benefits from extra information learned during the expansion of the first seed. For example, more information about the intensity statistics of data grid points within the anatomical structure is available, at least because the new seed basis is larger. Also for example, the second seed optionally begins with a partial contour of the tissue to be segmented already determined, from which the remaining segmentation boundary extends. Furthermore, knowing part of the boundary (particularly if that part is a closed curve defining a whole circumference of the anatomical structure), potentially places constraints on the likely maximum and/or minimum sizes of the anatomical structure in regions of the 3-D data that remain to be analyzed. The boundary is also optionally used to place constraints on the gradient (edge) statistics of grid points along the anatomical structure's contour.

Figure 1B:
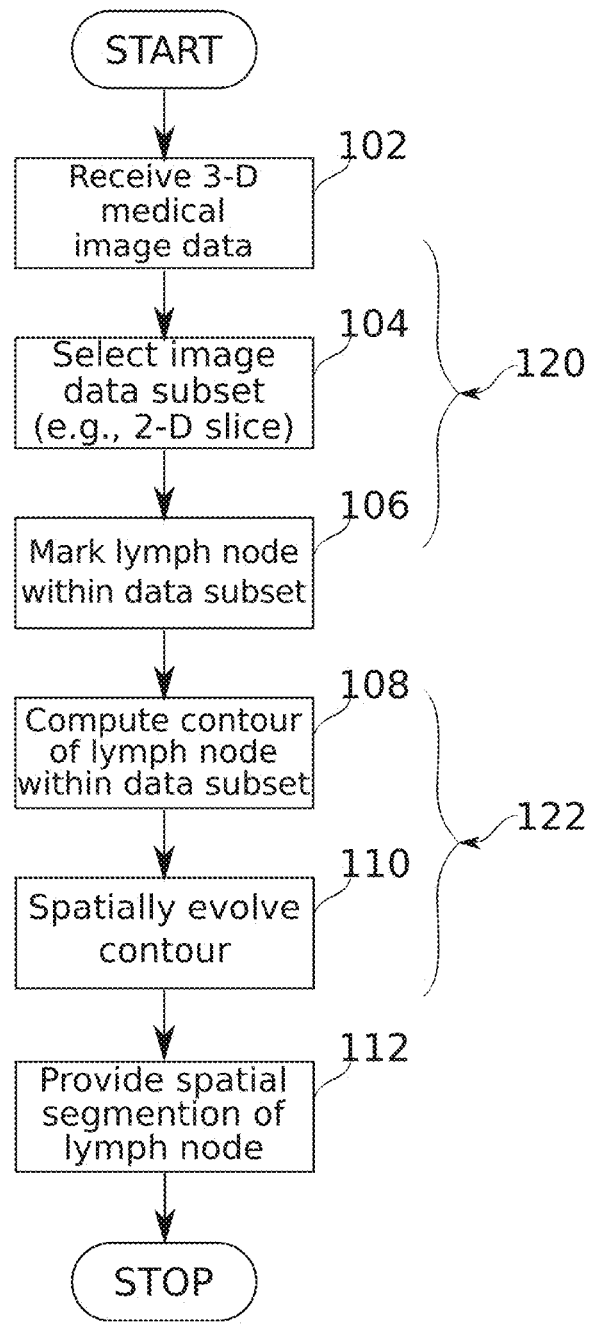
FIG. 1B is a flowchart of a more particular method for spatially segmenting an anatomical structure (optionally, a lymph node) in a 3-D medical image, according to some exemplary embodiments of the invention.

Reference is now made to FIG. 1B, which is a flowchart of a more particular method for spatially segmenting a lymph node (or other anatomical structure, such as cyst, nodule tumor or other type of a lesion) in a 3-D medical image, according to some exemplary embodiments of the invention.

A first group of blocks 120 relates to initialization operations of the method.

At block 102, in some embodiments, the flowchart begins, and 3-D medical image data are provided. The data comprise a plurality of 2-D slices.

At block 104, in some embodiments, a 2-D slice is selected. In some embodiments, a user makes an indication through a computer input device that results in the selection of a 2-D slice to display as a planar image.

Optionally, the indication is a direct selection of the 2-D slice for display. Optionally, the indication is an indication of an image point or region, on the basis of which automatic selection of a 2-D slice occurs. The selected slice is optionally an axial slice, or any other two-dimensional image, such as a multi-planar reconstruction (MPR) image.

In some embodiments, the 2-D slice (or thin slab) is chosen to be from about the middle of a stack of parallel slices including the lymph node (for example, chosen to contain a longest diameter and/or short-axis as suggested by RECIST [1], which for most cases is a central slice). This potentially increases the likelihood that the lymph node is generally decreasing in at least one dimension when passing to slices obtained from either side of the selected 2-D slice. In some embodiments, a 2-D slice is chosen to comprise a "central contour" of the lymph node, wherein a central contour is a contour chosen from among the largest-area contours on a sequence of consecutive planar medical images comprising the lymph node.

Alternatively or additionally, the initial plane is any plane that includes the lymph node, and other aspects of the method are suitably adjusted to account for deviation from a central position and/or an oblique section angle.

In case of initial parameters being noticed to produce an incomplete and/or incorrect segmentation, the algorithm can be used on different parameters chosen by a "brute force" approach. For example, the algorithm is run for a number of different geometrical possibilities. Optionally, the result selected as correct is where initial assumptions/parameters converge on a consistent result, and/or produce a result having maximal volume (and/or another suitable criterion). Such an approach is described in relation to FIG. 9, hereinbelow. It is to be understood, moreover, that any suitable combination of these or other approaches is performed in some embodiments of the invention. Aspects of other alternative approaches are also described hereinbelow.

At block 106, in some embodiments, inputs on the lymph node (or other anatomical structure of interest) are marked within the selected image data subset.

In some embodiments, a selection is made comprising a representative line segment within a lymph node of interest on the displayed slice.

In some embodiments, making the selection comprises indication by a user of two points defining a representative line segment within the lymph node on the selected slice. Alternatively or additionally, making the selection comprises indication of other locations for marking the lymph node, for instance a single point inside it.

Optionally, the indication is through manipulation of a computer mouse or other pointing device.

In some embodiments, the location points are selected according to one or more additional constraints. For example, a single location point inside the lymph node is treated by the algorithm as occupying a position within a region at or nearby the centroid of the lymph node. Additionally or alternatively, two location points are assumed, in some embodiments, to be located on the lymph node's boundary and to occupy the ends of a representative line segment within the lymph node.

Optionally, a representative line segment is the longest diameter of a lymph node or other globular tissue structure under inspection. Per RECIST [1-2], the longest diameter is the maximal diameter measured in the plane in which the images were acquired. Optionally, a representative line segment of the tissue structure is the short-axis. Per RECIST, the short-axis is the longest segment that spans the tissue structure perpendicular to the longest diameter on the same 2-D slice. Optionally, another representative line segment is used, for example: the diameter of the anatomical structure mathematically defined as the line segment that connects a pair of grid points on the boundary of the structure with the largest distance, or a chord that connects a pair of grid points on the boundary of the structure for which the distance is not necessarily the maximal one (i.e. the chord is not necessarily a diameter).

It is a potential advantage to provide the representative line segment according to a recommendation of RECIST [1-2], to allow one input to serve both as a basis for "normal" RECIST recommendation based estimations, and as the results (for example, the total volume) calculated according to an embodiment of the invention. Furthermore, using the RECIST recommendation potentially allows an operator already familiar with the RECIST recommendation to continue operating according to this method, which can reduce a period of training, decrease opportunities for confusion, and/or increase confidence in interpreting final results.

In some embodiments, upon marking and/or confirmation of the representative line segment selection, a two-tier algorithm, represented by block group 122, is launched to spatially segment the lymph node. In some embodiments, the algorithm proceeds to completion fully automatically, without any additional user intervention.

At block 108, in some embodiments, a planar (or otherwise partial) first contour of the lymph node on the selected 2-D slice is segmented. The potential advantage of first calculating a partial contour is that it can be performed under conditions that allow a relatively "safe" expansion of the seed, into the surrounding ROI. By "safe", is meant that the expansion is likely to include only or almost only grid points that actually belong to the lymph node, and/or that errors are likely to be easily identified.

For example, it may be difficult to initially define a tightly-enclosing VOI for the entire lymph node, but relatively straightforward to define an ROI constraint within a 2-D (or 3-D but substantially slab-like) partial region of the data.

In some embodiments of the invention, determination of the partial contour comprises expansion of the seed by an evolution of the seed contour through a level set framework that defines a higher-dimensional function defining how the evolution occurs over "time", comprising a process of iterations.

At block 110, in some embodiments, the detected planar contour from block 108 is spatially expanded to include the entire lymph node.

Figure 2:
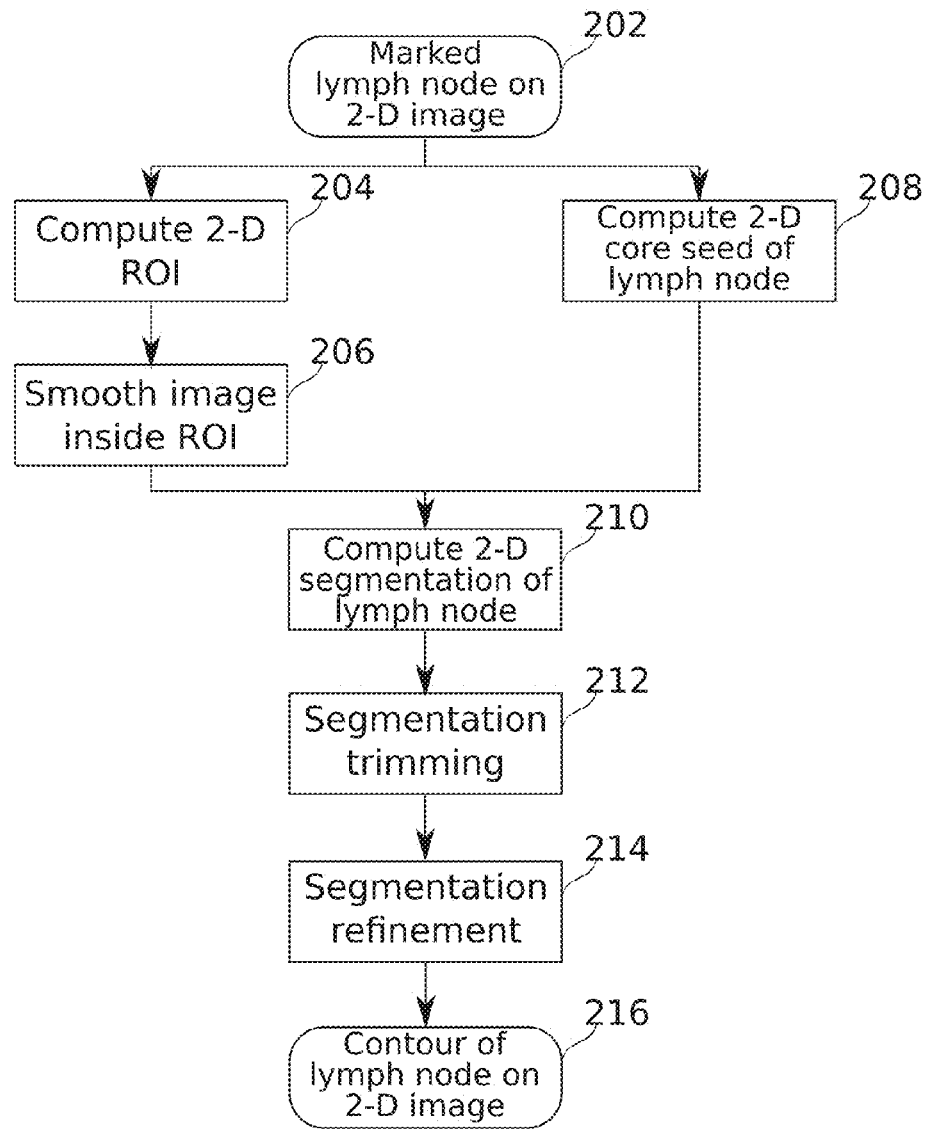
FIG. 2 is a schematic flowchart of a method for segmenting the contour of an anatomical structure (optionally a lymph node) on a 2-D image, according to some exemplary embodiments of the invention.
Figure 4:
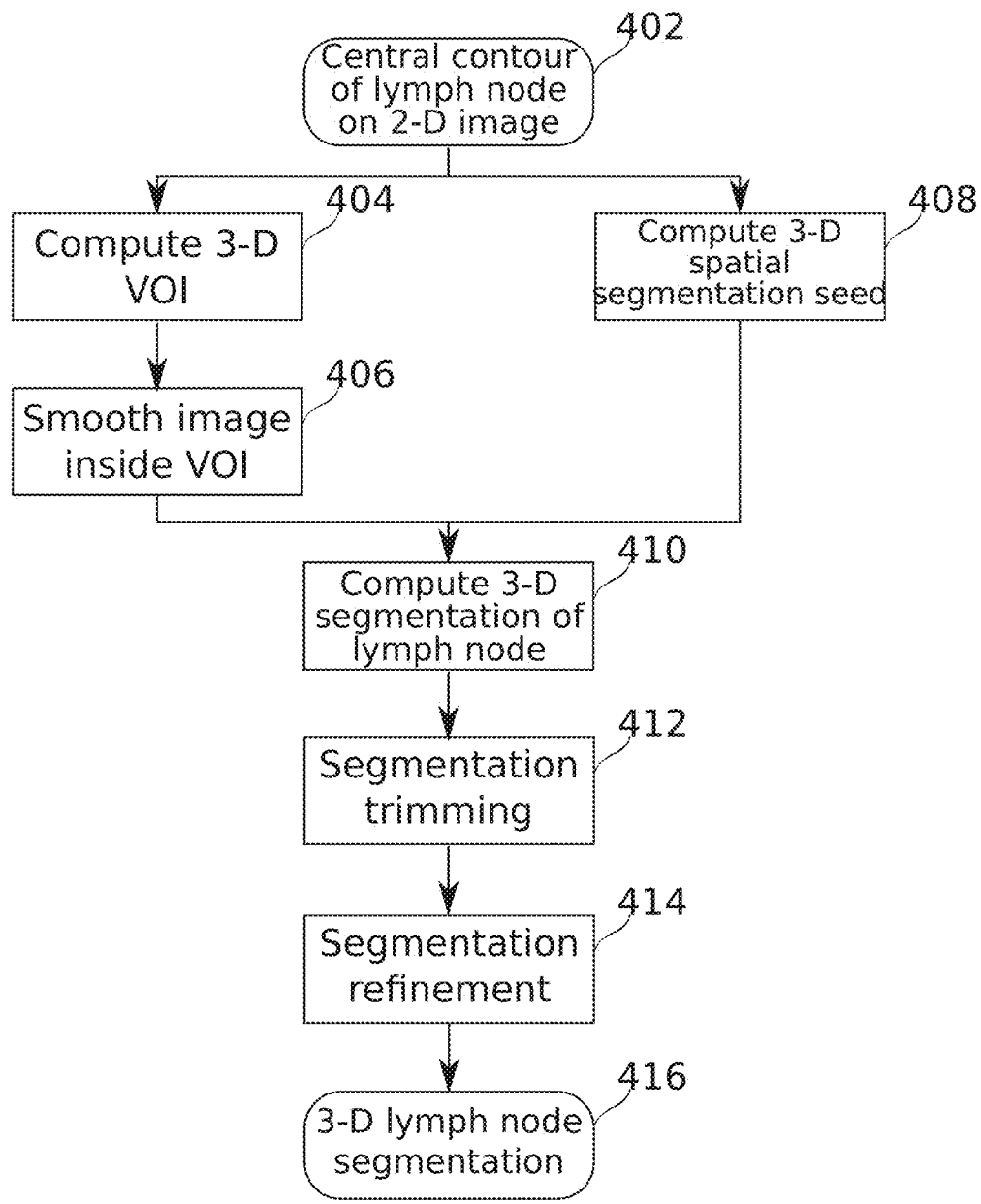
FIG. 4 is a schematic flowchart of a method for spatial expansion of a planar segmentation of an anatomical structure (optionally a lymph node), according to some exemplary embodiments of the invention.

Operations that blocks 108 and 110 comprise are detailed, for example, in FIG. 2 and FIG. 4 respectively.

At block 112, in some embodiments, the resulting 3-D segmentation of the lymph node is displayed to the user through a computer display. Optionally or alternatively, a calculated volume of the segmentation is displayed.

2-D Segmentation

Reference is now made to FIG. 2, which is a schematic flowchart of a method for segmenting the contour of an anatomical structure on a 2-D image, according to some exemplary embodiments of the invention. More particularly, FIG. 2 shows a flowchart of a method for segmenting the contour of a lymph node on a planar image.

At block 202, in some embodiments, the input for the method is provided. Optionally, the input comprises a 2-D image, and a representative line segment within the lymph node on that image. Optionally, the representative line segment is the longest diameter of the lymph node, i.e. the longest line segment through the lymph node, measured in the plane in which the images were acquired (almost always the axial plane for CT medical data) [1-2]. Optionally and alternatively, the representative line segment is the short-axis of the lymph node, i.e. the longest line segment through the lymph node that is perpendicular to its longest diameter on the same 2D image, as recommended by RECIST [1-2]. Optionally, the representative line segment approximately passes through the centroid of the lymph node. Optionally, the representative line segment is defined by the pair of its endpoints. Optionally or additionally, the input comprises a single location, for instance a position within a region at or nearby the centroid of the lymph node.

At block 208, in some embodiments, an initial seed for the segmentation is computed, based on the inputs of block 202. Optionally, the seed is further based on information that is extrapolated from these inputs. In some embodiments, the seed is determined such that it is completely enclosed by the lymph node. Optionally, the seed is computed as a circular region or a 2-D ball within the 2-D image slice. Optionally, for example, if a single location is provided as an input (e.g. the centroid of the lymph node or a nearby position), the seed is centered at this location and a region within some predefined distance from the selected location point is considered to form the seed. Optionally, the seed is centered at the midpoint of an input representative line segment and comprises a circular region for which the two endpoints of the line segment comprise opposite ends of a diameter. Optionally, for example, if the two endpoints of the representative line segment are assumed to be located on the lymph node's boundary, the seed as well is considered to include points on the lymph node boundaries.

At block 204, in some embodiments, a region of interest (ROI) is computed. The ROI is used in some embodiments to define the set of grid points in the selected portion of the image data that are potentially included in the segmentation of the lymph node and grid points outside the ROI are excluded from the segmentation in advance.

In some embodiments, the ROI, which specifies the region within which the segmentation seed is allowed to expand, is constructed with the goal to completely enclose the anatomical structure to be segmented with minimal number of pixels outside it. Such a selection of an ROI reduces the number and/or severity of erroneous segmentation outcomes. For example, the ROI potentially limits the extent of a partial "escape" of the algorithm from the actual boundaries of the anatomical structure, due, for example, to two tissues of similar intensity being closely adjoining.

In some embodiments, the ROI is determined based on one or more assumptions about the shape of the anatomical structure and/or the relationship of the input location data on the selected 2D image to the overall form of the anatomical structure as it extends through the selected data portion. Optionally, the ROI is calculated as an area enclosed by a circle, an ellipse or another oval, having particular parameters and/or particular relationships among the parameters that define it. This provides a potential advantage for segmentation of anatomical structures with compact convex shapes (egg-shapes), such as lymph nodes, since such an ROI with proper dimensions may capture all the pixels of the anatomical structure, with minimal numbers of pixels outside it. For example, if the input comprises a single location point (e.g. the centroid of the anatomical structure or any other point inside it), the ROI is optionally centered at this point and a region within some predefined distance from the selected location point is considered to form a circular ROI. Optionally, if two location points are selected, and these location points are assumed to be located on the bounds of a representative line segment (e.g. the longest diameter or the short-axis) of the anatomical structure, then the ROI is centered at the midpoint of the representative line segment. Optionally, the ROI is constructed as an ellipse having a ratio of one axis to the other of, for example, about 3:1, the larger axis being chosen according to whether the two location points selected are assumed to lie across the longest diameter or the short-axis of the lymph node in the selection section. Determination of such a 2-D ROI is also detailed, for example, in relation to FIGS. 6A-6B, and FIGS. 3A-3B.

Optionally for CT images, the ROI (computed at block 204) and/or the seed (computed at block 208) are restricted to pixels of typical Hounsfield (HU) values for lymph nodes (or whatever tissue type is being segmented) by applying a logical AND operation with a binary thresholded mask. Optionally, the mask is composed of all pixels of values between −100 HU and 200 HU (this range is used, for example, in the segmentation of lymph nodes). In some embodiments, another range of HU values is used appropriate to the tissue type, for example, a range from −100-0 HU, −50-50 HU, 0-50 HU, 30-45 HU, 20-30 HU, 40-60 HU, 5-100 HU, 100-300 HU, or another range having the same, larger, smaller, and/or intermediate values. It should be noted that theoretically (although this has not been observed in practice), such an operation might cause holes within the seed and within its mirror in the ROI. Optionally, to guarantee that the seed is convex, holes are filled.

At block 206, in some embodiments, the image is smoothed in the ROI. This has the potential advantage of reducing contributions to the image by noise inherent to medical imaging equipment and its operation.

In some embodiments, smoothing is performed by applying the anisotropic diffusion technique [4]. Potentially, this reduces image noise without blurring away significant sharp image boundaries that distinguish between lymph nodes and their surroundings. Optionally, ten smoothing iterations are performed, where the time step is 0.1, the diffusion function of the image's gradient is g $(\nabla I)=1/(1+(\|\nabla\|/K)^2)$, the conductance parameter K is 10.0 and all the eight nearest-neighbors of a pixel are considered. It should be understood that the number of iterations, time step and conductance parameters are optionally selected to be greater or lesser values than those mentioned. Optionally, a different number of nearest-neighbor pixels (or other neighboring pixels) are considered. Optionally, a different diffusion function of the gradient is applied. It should be understood, moreover, that another appropriate smoothing function is applied additionally or optionally.

At block 210, in some embodiments, the initial seed of the segmentation is expanded inside the ROI. The method by which the seed is expanded is selected such that the entire (or substantially the entire) contour of the lymph node on the 2-D image becomes enclosed, with little or no leak across the lymph node contour (leakage that does occur is treated, for example, in block 212). Seed expansion is also detailed, for example, in relation to FIG. 6C. Optionally, the segmentation is performed using the level set approach [3], described in relation to FIG. 5.

At block 212, in some embodiments, possible leakages in the resulting segmentation from block 210 are detected and the segmentation is trimmed accordingly. In some embodiments of the invention, shape-based constraints are imposed on the segmentation. For example, the shape of a lymph node, even when it is enlarged, is expected to be convex or more generally a star-convex one. Optionally, at block 212, the segmentation is further trimmed by morphology operations that incorporate intensity and/or shape constraints. Examples of trimming and/or leakage removal are also described, for example, in relation to FIGS. 6D-6E.

At block 214, in some embodiments, the trimmed segmentation is refined. Optionally, the refinement is performed by reapplying the level set approach [3], for example as described in relation to FIG. 5. Optionally, morphology operations, such as closing, are applied to smooth the boundary of the segmentation.

At block 216, in some embodiments, the resulting 2-D segmentation of the lymph node is returned as an output.

Figure 6A:
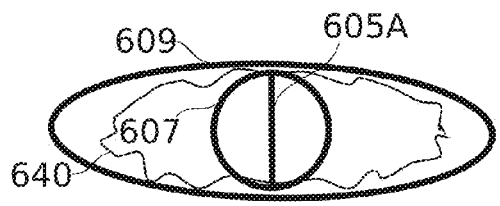
FIGS. 6A and 6B schematically illustrate two possible representative line segments, segmentation seeds, and regions of interest (ROIs), relative to a schematic 2D contour of an anatomical structure (optionally a lymph node), according to some exemplary embodiments of the invention.
Figure 6B:
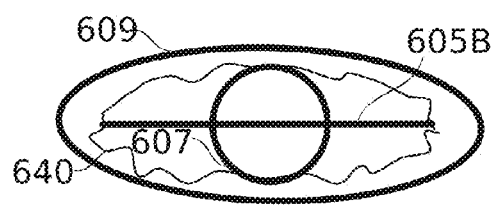

Reference is now made to FIGS. 6A and 6B, which schematically illustrate two possible representative line segments 605A and 605B, seeds 607, and regions of interest (ROIs) 609, relative to a schematic lymph node contour 640, according to some exemplary embodiments of the invention.

In some embodiments, the initial diameters of the ball seed 607 and the ellipse (or other oval or egg-shaped curve) ROI 609 are determined based on the representative line segment 605A or 605B. Optionally, a maximal estimated ratio between the longest diameter and the short axis of a lymph node is taken into account. For example, this ratio r is set to 3. In some embodiments, the ratio is another number, for example, a number in a range between about 1 and about 5, or within another range having the same, greater, lesser, and/or intermediate bounds. Optionally, the ratio is about, for example, 1.5, 2, 2.5, 3, 3.5, 4, 4.5, 5, or another greater, lesser, or intermediate number.

In a first example of ROI and/or 2-D ball seed generation: if the representative line segment 605A is the short-axis diameter of the lymph node ($\vec{d}_{short}$ having length $d_{short}$), then initially the diameter of the ball seed 607 and the conjugate (short) diameter of the ellipse or oval ROI 609 are determined as $\vec{d}_{short}$, where the transverse (long) diameter of the ROI 609 is determined as the perpendicular diameter with length $r \cdot d_{short}$.

In a second example of ROI and/or 2-D ball seed generation: if the representative line segment 605B is the long-axis diameter ($\vec{d}_{long}$, having length $d_{long}$), then initially the diameter of the ball seed 607 is determined as $$\frac{\vec{d}_{long}}{r},$$

the transverse diameter of the ROI 609 is determined as $\vec{d}_{long}$, and its conjugate diameter is determined as the perpendicular diameter with length $$\frac{d_{long}}{r}.$$

In some embodiments, the value of r is modified to account for major deviations from an ovoid (elliptical) shape. Optionally, for example if the longest diameter is used to set the ROI major axis, r is set to a lower value. Additionally or alternatively, for example if the shortest diameter is used to set the ROI major axis, r is set to a larger value. Potentially, this reduces the likelihood that a portion of the tissue region for segmentation will be excluded.

Optionally, the resulting seed ball 607 is slightly eroded (e.g. one or more erosions are applied). Optionally, the resulting ROI 609 is slightly dilated (e.g. the number of dilations is the maximum between 2 and third of the length of the short axis or of its estimation, or another number of dilations). These modifications potentially increase the tolerance of the algorithm to non-typical cases, e.g., cases where the lymph nodes do not possess ideal oval-shapes.

Figure 9:
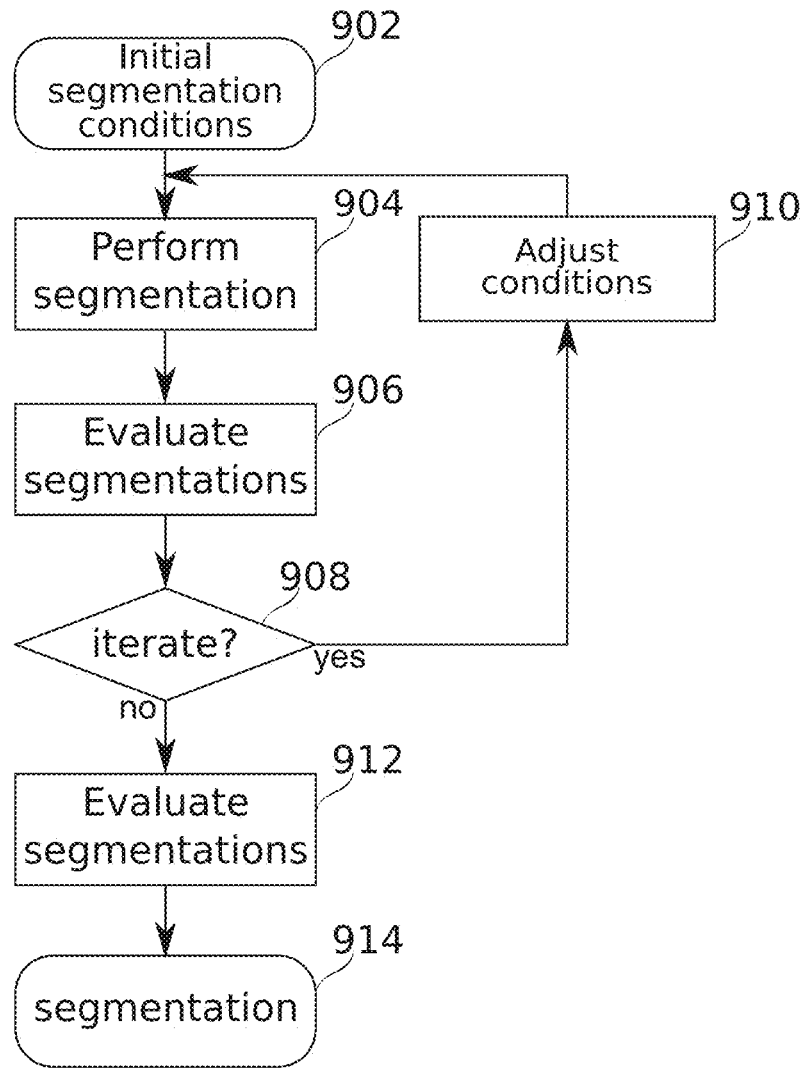
FIG. 9 is a schematic flowchart illustrating an iterative application of a segmentation algorithm, according to some exemplary embodiments of the invention.

In some embodiments, insufficient and/or uncertain initial conditions are supplemented by multiple iterations of the algorithm with different input values, for example as described in relation to FIG. 9.

Figure 3A:
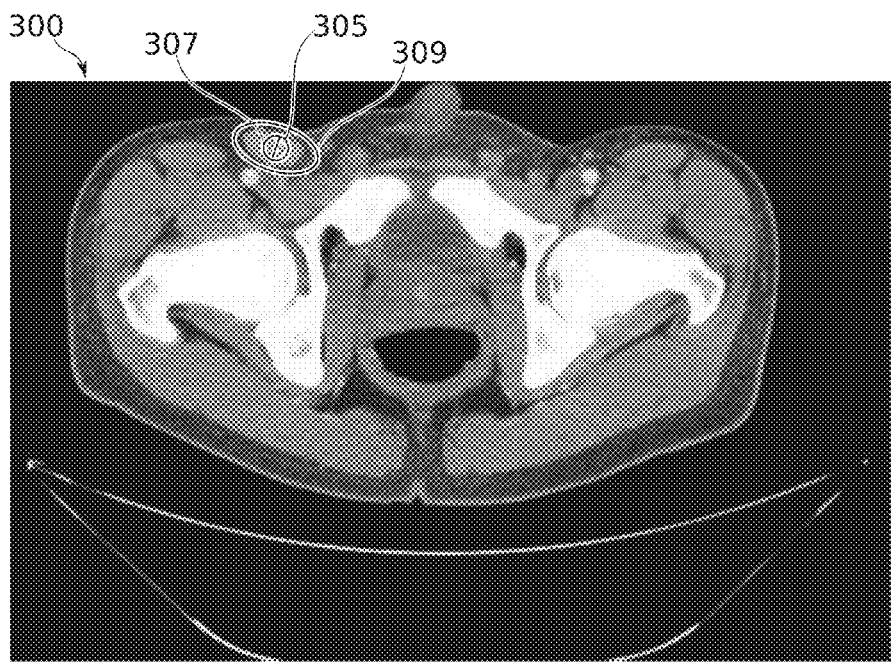
FIGS. 3A and 3B schematically illustrate the geometric construction of an initial segmentation seed and ROI given the short-axis diameter of a lymph node, according to some exemplary embodiments of the invention.
Figure 3B:
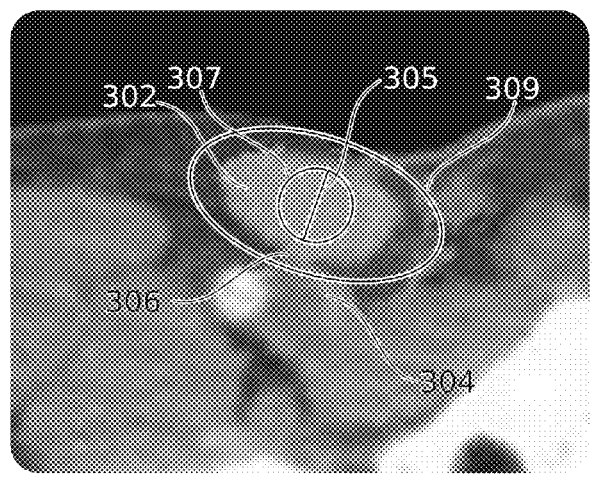

Reference is now made to FIGS. 3A-3B, which schematically illustrate the geometric construction of an initial segmentation seed and ROI given the short-axis diameter 305 of a lymph node 302, after applying the process of FIG. 6A, according to some exemplary embodiments of the invention. FIG. 3B comprises an expanded view of a region of FIG. 3A. The 2-D image slice 300 comprises a transverse cross-section of a pelvis, including a lymph node 302. Line segment 305 defines the short-axis of lymph node 302. Seed 307 falls within the light gray region (cross-section) of lymph node 302, while ROI 309 is selected to enclose the dimensions of the lymph node 302 cross-section.

The initial constructions of a seed and an ROI, for example, as described both in FIGS. 6A-6B, provide certain potential advantages for the subsequent phases of the segmentation algorithm. For example, since the seed is understood to begin entirely within the lymph node, it can be assumed that the boundaries of the lymph node are approached from within. Interactions of the growing seed with border features such as gradient and contrast, for example, can thus be specified without special concern for which side of the border is being approached.

It can be understood that a seed that is too small potentially provides an insufficient statistical profile of the lymph node pixel values to capture all of the lymph node, while a seed that is too large potentially leads to including pixels outside the lymph node. Due care in the parameter setting (e.g. the r parameter and the number of erosions/dilations in the seed and ROI constructions respectively) and in the selection of the initial conditions (such as providing a representative line segment spanning a tissue region to be segmented) potentially prevents this. Also for example, making the seed diameter initially close to at least one diameter of the lymph node helps to ensure that the seed comprises a representative selection of image intensity and/or gradient values within the lymph node overall.

With respect to the ROI, it is a potential advantage for the ROI to be large enough to enclose the lymph node entirely (or substantially entirely). The choice of a "typical" (maximum) ratio of the longest diameter to the short axis generally allows this condition to be met, given knowledge of at least one of the axes. It can be understood, however, that due to the convex egg-like shape of the lymph node, even where a slight truncation at the ends occurs, the overall impact on the final segmentation is potentially low enough to be neglected. Conversely, it is also a potential advantage for the ROI to be not so large that a "leak" (expansion past a boundary, such as boundary 306 where the lymph node is similar [by intensity and/or by lack of an edge, for example] to surrounding tissue 304) will destroy the ability to make reasonable estimates of lymph node volume.

Optionally, an operator has the option to choose an initial section wherein initial ROI/seed ratio assumptions (for example, a 3:1 major:minor axis ratio, and/or seed placement central to the lymph node) of the algorithm are met. Additionally or alternatively, an operator has the option of varying these parameters based on feedback provided visually on a display of the section with the ROI, seed, and/or representative line segment, or by another method. Optionally, the representative line segment itself is adjustable by the operator based on visual display of the ROI, seed, and/or representative line segment.

Optionally, when the endpoints of the representative line segment are assumed to be on the lymph node's boundary (for example as in the case where the representative line segment is the longest diameter or the short-axis of the lymph node), pixels outside the representative line segment but on the same line are excluded from the ROI. This potentially ensures that the two endpoints of the given representative line segment will be located on the boundary of the final segmentation and not inside it.

Figure 5:
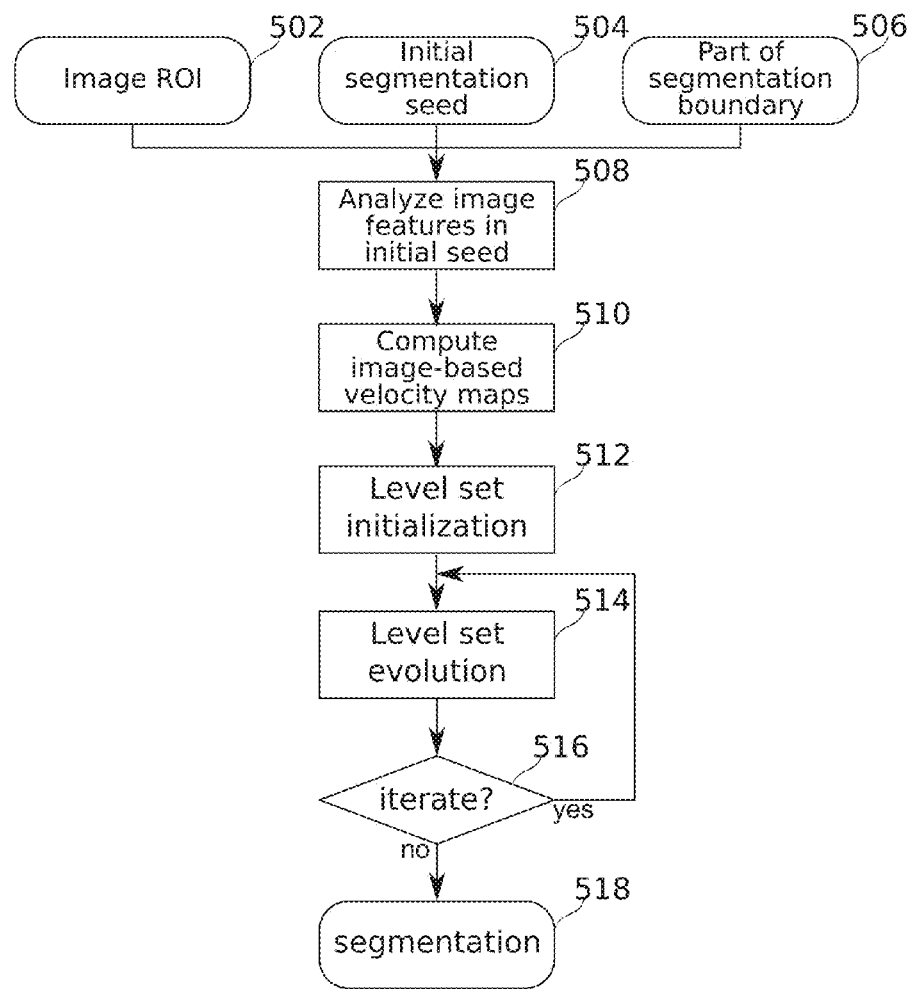
FIG. 5 is a schematic flowchart of an approach for expanding and refining an initial segmentation of an anatomical structure (optionally a lymph node) based on the level set paradigm, according to some exemplary embodiments of the invention.
Figure 6C:
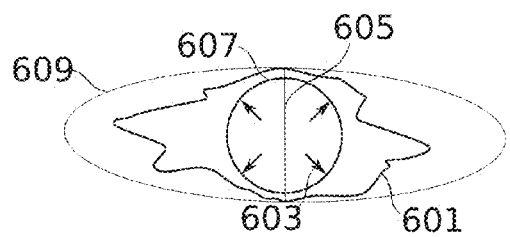
FIG. 6C schematically illustrates expansion of an initial seed within an ROI, to substantially fill the contour boundary of an anatomical structure (optionally a lymph node), according to some exemplary embodiments of the invention.

Reference is now made to FIG. 6C, which schematically illustrates expansion in directions 603 of an initial seed 607 within a ROI 609, to substantially fill the contour boundary of a lymph node (or whatever tissue type is being segmented) 601, as also discussed above in relation to block 210 of FIG. 2. In this example, representative line segment 605 is shown across the short axis of the lymph node. It should be understood that lymph node boundary 601 is shown with exaggerated irregularities for the purposes of illustration. Optionally, the expansion is performed using the level set approach [3], for example as described in relation to FIG. 5.

Figure 6D:
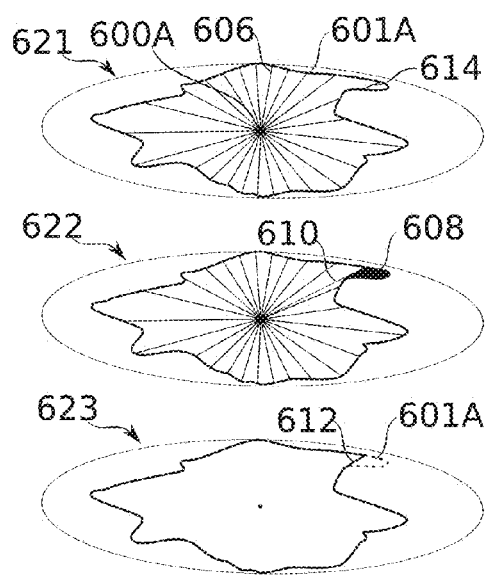
FIG. 6D schematically illustrates stages of the application of a star-convex constraint to an initial contour, according to some exemplary embodiments of the invention.

Reference is now made to FIG. 6D, which schematically illustrates stages 621, 622, 623 of the application of a star-convex constraint to an initial contour 601A, according to some exemplary embodiments of the invention. This is an exemplary method for performing, in some embodiments, part or the entire segmentation trimming described in block 212 in FIG. 2 and/or block 412 in FIG. 4.

In some embodiments, the segmentation 601A is trimmed based on a star-convexity constraint, where the star point is the central pixel 600A of the initial segmentation seed 607 in FIG. 6C (optionally the midpoint of the representative line segment 605, and/or an initially specified centroid). In some embodiments, pixels comprising the segmentation 601A are evaluated; on this basis, pixels for which the straight connecting line segment 606 to the seed's center 600A is not fully inside the segmentation are filtered out. For example, segment 614 is broken by the boundary of the segmentation 601A.

Optionally, this filtering is implemented such that the line segment 606 connecting to the star point 600A is not evaluated for every pixel in the segmentation, but is evaluated for multiple pixels simultaneously. Specifically, when evaluating the star-connectivity predicate for a pixel, a straight connecting line segment traces the star point 600A to that pixel. Starting from the star point 600A, pixels along the line segment are iterated over until reaching either an endpoint, or a pixel outside the segmentation. If all the pixels along the line segment are inside the segmentation 601A, then all of them are considered as star-connected and thus remain in the segmentation. If a pixel outside the segmentation is encountered, then only the pixels up to this pixel remain in the segmentation. Stage 622 shows a region 608, bounded on one side by star-ray 610, and within which each pixel is excluded from the new segmentation 612, as shown at stage 623.

Figure 6E:
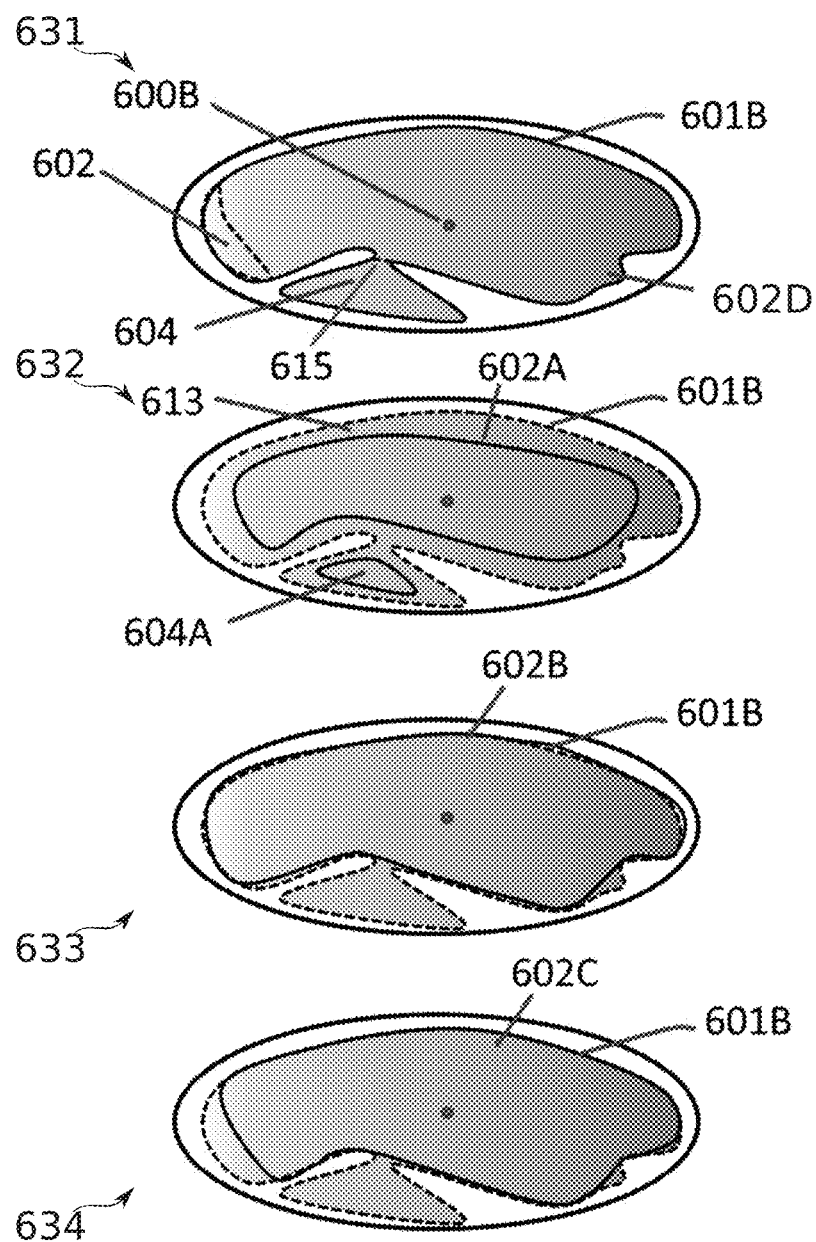
FIG. 6E schematically illustrates an application of shape and intensity constraints to an initial segmentation, according to some exemplary embodiments of the invention.

Reference is now made to FIG. 6E, which schematically illustrates an application of shape and intensity constraints to an initial segmentation 601B, according to some exemplary embodiments of the invention. This is another exemplary method for performing, in some embodiments, part of or the entire segmentation trimming performed in block 212 of FIG. 2 and/or block 412 in FIG. 4.

In some embodiments of the invention, distal regions connected to the main body of the segmentation via narrow 'corridors' (isthmuses) are filtered out (for example as shown in region 604, which is connected to the main body of the segmentation 601B by a narrow corridor 615, as shown in stage 631). Optionally, this filtering is based on assuming that lymph nodes and other anatomical structures like cysts, nodules, tumors and lesions possess convex shapes.

Additionally or alternatively, regions of relatively high intensities on the segmentation's boundary are filtered out. Optionally, this filtering takes advantage of the usual case that the highest intensities are at the core of a lymph node, with intensities fading on its boundary, due to partial volume. As a result, high intensities on the segmentation's boundary are typically either due to noise, or due to the segmentation having invaded a neighboring tissue. Such cases should be excluded from the segmentation. For example, region 602 of stage 631 optionally represents a region that is "too high" (bright) in intensity, relative to its position near the segmentation boundary. Although described here in connection to lymph nodes and in particular relates to their appearance, for example, in CT images, it is to be understood that such assumptions are also valid for anatomical structures like cysts, tumors, lesions, and/or changed as necessary (for example, by rejecting low intensity pixels) for the specific tissue type to be segmented and/or image type from which the segmentation is to be made.

Additionally or alternatively, thin sharp protrusions (for example, region 602D of stage 631) are eliminated from the segmentation. Optionally, this filtering is based on the assumption that lymph nodes and other anatomical structures like cysts, nodules, tumors and lesions possess convex shapes and smooth (or non-sharp) boundaries.

Optionally, the filtering procedures are performed by morphology and/or intensity thresholding as follows. It should be understood that the application of these constraints is shown combined for convenience of exposition, and as a way of illustrating how the filtering is potentially efficiently performed.

An initial segmentation 601B having a central point 600B (e.g. the star point) is shown at stage 631. At stage 632, the segmentation 601B is eroded multiple times, where the number of times is optionally defined as a fraction ratio (e.g. 0.15) of the length in pixels of the representative line segment of the lymph node. In some embodiments, the number of times is limited by one or more fixed numbers; for example, the number of iterations is limited to be between 1-5, 1-3, 4-10, 5-15, or within another range having the same, smaller, larger, and/or intermediate bounds. In some embodiments, the number of times is according to a different fraction ratio, for example, 0.10, 0.20, 0.25, or another larger, smaller, and/or intermediate ratio. In the depicted example for stage 632, the result of the erosion consists of region 602A, which is the main body of segmentation 601B, and the distal region 604A.

Potentially, in addition to removing a boundary ring 613 around the segmentation, the erosion also removes 'narrow corridors' (isthmuses) to distal regions (such as the narrow corridor 615, which has connected the distal region 604 to the main body of the segmentation 602A before the erosion). This removal disconnects distal regions from the main body 602A of the segmentation (for example, the eroded region 604A becomes a disconnected region after the removal of region 615).

Then, to filter out the distal disconnected regions, the connected components of the resulting segmentation are detected and all of them, except for the component 602A containing the lymph node's central point 600B, are removed.

At stage 633, the boundary of the segmentation is recovered by dilating the main body of the segmentation 602A, where the number of dilations is equal to the number of initial erosions. The result is segmentation 602B.

Compared to the initial segmentation 601B, the segmentation 602B does not contain distal regions (e.g. region 604) that are connected to the main body of the segmentation 602A via narrow "corridors" (such as region 615). Additionally, the boundary of segmentation 602B is smoother than the initial segmentation 601B and small sharp protrusions (for example region 602D) are excluded due to the morphology opening operation that is generated by erosion followed by dilation.

Additionally or alternatively to the dilation of stage 633, the segmentation 602A is dilated in a computed mask in which grid points into which dilation would occur are set on only if they possess expected properties (for example, of intensity) of the segmented lymph node (for example, stage 634 is applied instead of stage 633). This potentially restricts the expansion of segmentation 602A to grid points with properties that are expected for lymph nodes. For example, stage 634 filters out from the initial segmentation 601B not only distal regions that are connected to the main body of the segmentation 602A via narrow 'corridors' and small sharp protrusions on the segmentation boundary (similarly to the alternative segmentation 602B), but also regions on the boundary of the initial segmentation with unexpected properties (for example, region 602).

Optionally, the expected and/or unexpected properties that define which grid points are set on in the computed mask are based on intensities and/or intensity gradients, either absolutely or relative to another part of the segmentation.

In the case, for example, of a lymph node, the criterion governing "unexpected" intensity is optionally generated from a rule that regions of the segmented region near the segmented boundary should be lower in intensity than near the center of the segmented region. For example, an expected range of intensities on the lymph node's boundary is estimated based on the intensity statistics of the initial segmentation seed (for example, the mean, standard deviation and order statistics). Optionally, the lowest value of the range is defined as 2.5 standard deviations below the mean, and the highest value is defined as the maximum between 1 standard deviation above the mean and the 70% order statistics. In some embodiments, another set of range-defining values is used; for example, lowest value in a range of between 2 and 3.5 (or within another range) standard deviations below the mean, and/or highest value defined as within a range of between about 0.5 and 1.5 standard deviations, between about 60% and 80% order statistics, and/or the maximum of both of these. In some embodiments, the range selection criteria are set so that pixels similar in intensity (for example, similar according to the range criteria just mentioned) to those on the seed borders that approach the lymph node borders are included in the estimated range of intensities on the lymph node's boundary. Additionally or alternatively, the range selection criteria are set so that pixels near the edge of the segmentation that are brighter than regions of the seed—particularly the regions in the center of the seed, which are expected to be among the brightest in the lymph node overall—are likely to be excluded.

In some embodiments, based on the chosen estimated range of intensities, a binary mask is computed by thresholding the medical image.

In the example shown in FIG. 6E, if region 602 represents a region that is "too high" in intensity, relative to its position near the segmentation boundary, then it is to be rejected in stage 634 when expanding the main body of the segmentation 602A to result in a final segmentation 602C in which high-intensity regions are excluded.

3-D Segmentation

Figure 7A:
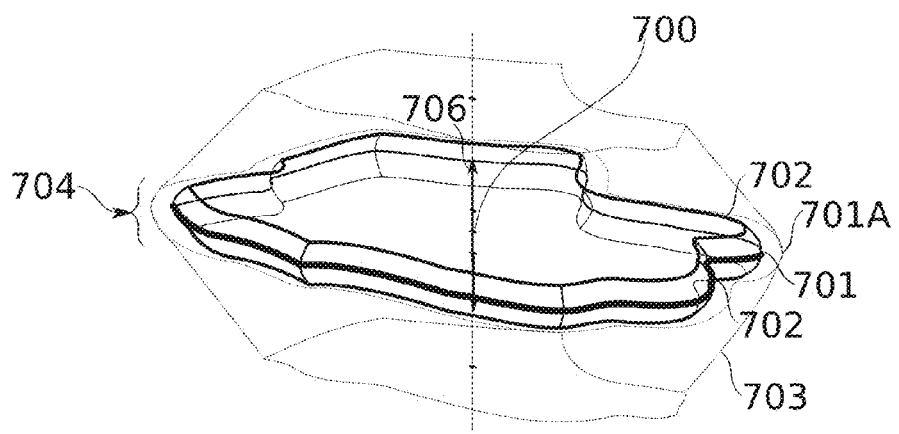
FIGS. 7A and 7B schematically illustrate the 3-D relationships of elements described in relation to the spatial expansion of FIG. 4, according to some exemplary embodiments of the invention.
Figure 7B:
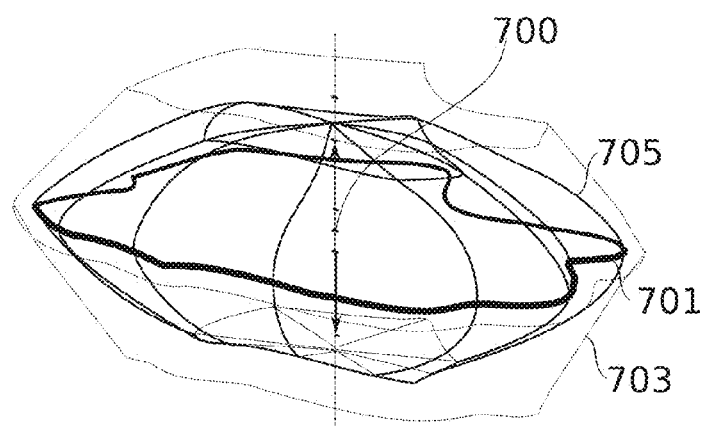

Reference is now made to FIG. 4, which is a schematic flowchart of a method for spatial expansion of a planar segmentation of an anatomical structure (optionally a lymph node), according to some exemplary embodiments of the invention. The method corresponds, in some embodiments, to the 3-D segmentation of block 110 of FIG. 1B. Reference is also made to FIGS. 7A and 7B, which schematically illustrate the 3-D relationships of elements described in relation to the spatial expansion of FIG. 4, according to some exemplary embodiments of the invention.

At block 402, in some embodiments, input for the method is provided. In some embodiments, input comprises a central contour 701 of a lymph node on a planar medical image. A central contour 701 is a contour chosen from among the largest-area contours on a sequence of consecutive planar medical images comprising the lymph node. Optionally, this contour is the contour with the largest diameter of the lymph node and/or the short-axis lymph node, as recommended by RECIST W. Due to the typically convex and compact shape of lymph nodes (or other egg-shape anatomical structures), a central contour is typically found on one of the internal planar images of such a sequence.

At block 408, an initial spatial segmentation seed 704 is computed. As for block 208 of FIG. 2, the seed is optionally defined, in some embodiments, to be inside the lymph node (totally, or substantially totally). Optionally, seed 704 is initially defined to contain the given contour 701 of the lymph node and the projections of its central point 700 on the two adjacent slices. Optionally, the central point 700 is defined as the centroid of the input contour 701 and/or the midpoint of the representative line segment that was used to segment this contour (as described in FIG. 2). This initialization defines the segmentation seed as a true-spatial object rather than a planar one (e.g. a disk).

In some embodiments of the invention, block 408 includes an additional process for enlarging the spatial seed 704 outside the given contour 701. Optionally, iterative spatial extrapolation of contour 701 to adjacent parallel slices in both directions along the vertical diameter 706 is performed. Optionally, for each direction, an eroded version of contour 701 is copied to the adjacent parallel slice 702, and this erosion and copying is iterated for slices along the vertical diameter 706, with the contour of the seed being an eroded version of the contour of the seed on the previous slice. This extrapolation process relies on the assumption that the given contour 701 is a major central contour of the lymph node, and that as we move away from its slice along the vertical diameter 706, the contours of the lymph node diminish. Optionally, the iterative extrapolation process proceeds until the contour disappears, and/or until some vertical distance is reached. Optionally, the vertical distance is defined by a ratio incorporating the input representation line segment (e.g. the distance is half of the largest diameter of the lymph node). In some embodiments, the selected ratio of vertical distance to line segment length is another number, for example, a number in a range between about 0.4 and about 5, or within another range having the same, greater, lesser, and/or intermediate bounds. Optionally, the ratio is about, for example, 0.4, 0.75, 1.5, 2, 2.5, 3, 3.5, 4, 4.5, 5, or another greater, lesser, or intermediate number. Optionally, the number of erosions applied in each iteration is defined by the maximal expected length difference (for example, the length in mm) between the associated diameters of the lymph node contours on two adjacent slices (e.g. 2 mm) divided by the z-mm per pixel of the 3-D image.

At block 404, in some embodiments, a volume of interest (VOI) 703 is computed. As for the ROI determined in block 204 of FIG. 2, the VOI 703 is used in some embodiments to define the set of grid points in the selected portion of the image data that are potentially included in the segmentation of the lymph node and grid points outside it are excluded from the segmentation. In other words, the VOI specifies the volume where the spatial segmentation seed 704 is allowed to expand. Similarly to the ROI determined in block 204 of FIG. 2, the VOI is preferably defined to contain the entire, or substantially the entire lymph node. Such a selection of a VOI reduces the number and/or severity of erroneous segmentation outcomes. The spatial segmentation seed 704 thus lies within the VOI 703.

In some embodiments of the invention, an iterative process is applied to the central (planar or slab) contour 701 (and/or to the spatial segmentation seed 704) to enlarge it for the construction of the VOI 703.

The VOI is optionally constructed in a similar manner to the suggested iterative extrapolation process for constructing the spatial segmentation seed 704. The main difference is that the initial contour for the VOI construction is a dilated version 701A of the input contour 701 of the lymph node. Another difference is in the parameter that defines the number of erosions performed. For example, the number of erosions at each iteration is smaller, and/or spread over a larger number of sections.

Optionally, the number of dilations applied in order to obtain the initial contour for the VOI is defined by some fraction ratio (e.g. 1.5) of the length in pixels of a given representative line segment of the lymph node. In some embodiments, the number of dilations is determined from within a range of fraction ratios, for example, ratios of between 1 and 2, or within another range having the same, intermediate, larger and/or smaller bounds.

In some embodiments, the number of erosions applied in each iteration is optionally defined by the minimal expected length difference (for example, difference in mm) between associated axes of the lymph node contours on two adjacent slices (for example, 0.5 mm) divided by the z-mm per pixel of the 3-D image. In some embodiments, a function for the erosion value is defined, for example.

Optionally for CT images, the VOI and the spatial segmentation seed are restricted to pixels of typical Hounsfield (HU) values for the tissue type to be segmented; for example, by applying a logical AND operation with a binary thresholded mask. As stated above, this mask is optionally defined for segmentation of lymph nodes as the set of voxels in the image for which the value is between −100 HU and 200 HU. In some embodiments, another range of HU values is used appropriate to the tissue type, for example, a range from −100-0 HU, −50-50 HU, 0-50 HU, 30-45 HU, 20-30 HU, 40-60 HU, 5-100 HU, 100-300 HU, or another range having the same, larger, smaller, and/or intermediate values. Possible resulting holes within the seed and its mirror in the VOI are optionally filled. Potentially, this ensures that the seed remains convex (however, in practice such holes have not been observed to occur). Optionally, voxels outside the contour but on the same slice are excluded from the VOI.

Potentially, this ensures that the input contour will remain on the boundary of the segmentation on that slice.

At block 406, in some embodiments, the image is smoothed in the VOI, optionally by applying the anisotropic diffusion technique [4]. Optionally, the same parameters that were used in block 206 of FIG. 2 are used here.

At block 410, in some embodiments, the initial spatial seed of the segmentation is expanded in the VOI to produce a volumetric segmentation 705. The method by which the seed is expanded is selected such that the entire (or substantially the entire) volume of the lymph node on the image becomes enclosed, with little or no leak across the lymph node contour (leakage that does occur is treated, for example, in block 412). Optionally, the segmentation is performed using the level set approach [3], described in relation to FIG. 5.

At block 412, in some embodiments, possible leakages in the resulting segmentation of block 410 are detected. In some embodiments, the segmentation is trimmed accordingly. Potentially the most common leakages are those to adjacent slices, especially in cases where the resolution of the medical image is coarse (with a large z-mm per pixel). Specifically, in such cases the boundary between the lymph node and nearby tissues on adjacent slices might be invisible in the data (and/or invisible to the algorithmic methods used for boundary detection, for example due to similarities in intensity and/or gradient). In some embodiments, z-leakages are trimmed during iteration over the slices of the segmentation. On each slice, connected components of the segmentation are detected. Optionally, filtering out (removal) is of components for which the surrounding contour is not aligned with a boundary of a tissue. Such a leaking component is recognized, for example, by a gradient magnitude along its contour being small. A small gradient magnitude is optionally defined by similarity to the gradients within the interior of the segmentation component. Similarity in turn is defined, for example, as a gradient mean being less than 1 standard deviation (or another standard deviation value, for example, within the range of about 0.5-1.25, or within another range having the same, larger, intermediate, and/or smaller bounds) above the mean of the gradient magnitudes inside the component.

In some embodiments of the invention, the spatial segmentation is further trimmed by one or more of the filtering procedures applied to the 2-D segmentation in relation to block 212 of FIG. 2 and/or to FIGS. 6D-6E. Specifically, the segmentation is optionally first trimmed by imposing a star-convexity constraint on its shape, where the star point is the centroid of the input planar segmentation, the midpoint of a representative line segment supplied by the user, or another centrally located location. Additionally or alternatively, morphology and/or thresholding operations are applied on the segmentation to filter out areas of relatively high intensities on the segmentation's boundary. Additionally or alternatively, distal regions that are connected to the central component of the segmentation via narrow 'corridors' are removed. Optionally, the central component is defined as the connected component on which the star point is located.

At block 414, in some embodiments, the trimmed segmentation is optionally refined by morphology operations, such as closing, opening and filling holes. The operations are optionally applied slice-wise to get a solid smooth shape. Optionally, the number of closing and openings is at most 2. Optionally, the exact number depends on the estimated size of the lymph node (more operations for larger lymph nodes), which can be evaluated from, for example, the input contour or a representative line segment.

At block 416, in some embodiments, the resulting spatial segmentation of the lymph node is returned as an output.

Level Set Paradigm

Reference is now made to FIG. 5, which is a schematic flowchart of an approach for expanding and refining an initial segmentation of an anatomical structure (optionally a lymph node) based on the level set paradigm [3], according to some exemplary embodiments of the invention. In some embodiments, the level set approach is applied to a 2-D image (for example, used with blocks 210 and/or 214 of FIG. 2). In some embodiments, the level set approach is used on a 3-D image (for example, used with blocks 410 and/or 414 of FIG. 4).

The level set paradigm provides a potential advantage for tracing the motion of a segmentation's boundary (for example, a 2-D curve or a 3-D surface) during its evolution over time.

General Features of the Level Set Paradigm

In some embodiments of the invention, the level set paradigm [3] is used in one or more parts of the anatomical structure segmentation and/or analysis algorithms. This numerical method traces the motion of a time-evolving segmentation boundary. Specifically, the segmentation boundary is embedded as the zero level set of a higher dimensional time-dependent scalar function called the level set function. In some embodiments, the level set function is initialized with the boundary of an initial segmentation as its zero level set. Then, an iterative process updates the level set function based on image properties (e.g. intensities and gradient magnitudes) and/or the current state of the evolving segmentation (e.g. the curvature of its shape). The process proceeds until some convergence criterion is satisfied and/or until a predefined maximal number of iterations is reached. At the end of the iterative process, the zero level set is extracted. The contour of the segmentation on the image is defined based on the extracted zero level set.

In the level set paradigm, a segmentation's boundary is assumed to move along its normal direction with a known speed function F. The level set function that is used to trace its evolution over time is a function $\phi(p,t)$ that maps grid points p in the image at time t to scalars so that its zero level set at time $t\{p:\phi(p,t)=0\}$ represents the segmentation's boundary at that time. Movement of the segmentation's boundary is linked to the evolution of the level set function via an initial value partial differential equation, for example $\phi_t+F|\nabla\phi|=0$ (where $|\nabla\phi|$ is the normalized gradients of $\phi$) with the initial value $\phi(p,t=0)$ (defined so that its zero level set is the boundary of the input segmentation).

The evolution equation is optionally solved numerically by an iterative process for which several implementations are available. A straightforward approach is to update the level set function on the entire image or ROI in each iteration. Other more efficient approaches like the narrow band [5] and the sparse field implementations [6], update the function in each iteration only near its current zero level set.

To start the iterative process, the level set function is initialized for time t=0 so that its zero level set is the boundary of the input segmentation seed. Optionally, the initialization is by a signed distance transform, i.e. $\phi(p,t=0)=\pm d$, where d is the distance from a grid point p to the segmentation's boundary, and the plus or minus sign is chosen based on whether the point is outside or inside the segmentation, respectively. Alternatively, in the efficient implementations, such as the narrow band [5] or the sparse field implementations [6], the distance transform or an approximation for it is optionally computed only in a finite width band around the boundary of the initial segmentation seed. Values for the remaining points are set to some constant that indicates that they do not lie within the band.

In some embodiments of the invention, adopting the level set scheme for a specific segmentation application comprises formulation of a model for the speed function F that governs the level set evolution. The speed function is optionally defined by terms based on image features and the state of the evolving segmentation in comparison to the expected model of the object being segmented. Optionally, the speed function comprises three terms for propagation, curvature and advection [3]. The propagation term moves the segmentation's boundary, either outwards or inwards, towards desirable features in the image that fit the object model. The curvature term controls the shape of the evolving segmentation and maintains it smooth by moving its boundary inwards in a proportional manner to its curvature.

The advection term is optionally defined by the dot product of the unit vector perpendicular to the segmentation's boundary and the gradient vector of the edge-based velocity at that point. Similarly to the curvature term, the advection term moves the segmentation's boundary inwards (that is, counteracts outward velocity), forcing the expansion to slow down or stop as it approaches edges in the image ROI.

The propagation term is the main speed term that governs the level set evolution. In some embodiments, it is defined by some edge-indicator function [7], constructed to force segmentation to expand in inverse manner to local gradient magnitudes. As a result, the segmentation's expansion speeds up in regions of relatively uniform intensity and slows on relatively strong edges. Various options described in the literature define such a function. For example, the estimated range of gradient magnitudes within the image is mapped to a new range between zero and one using the Boltzmann Sigmoid function; that is:

$$V_{edge}(x) = \frac{1}{1 + e^{\frac{c - G(x)}{s}}},$$  Equation 1 where G (x) is the gradient magnitude at point x, c is a central gradient magnitude that will be mapped to 0.5 and s is the desired slope of the sigmoid curve, which should be negative for inverse mapping. A potential advantage of such mapping relies in its non-linear S-shape; namely, the steepest mapping is performed around the center with a smooth continuous transition in the borders.

Additionally or alternatively, the propagation term is defined based on a region intensity distribution rather than on local gradients. Potentially, this induces the segmentation to expand in regions with intensities within some predefined intensity interval, and to contract otherwise. Thus, unlike edge-based velocities, intensity-based velocities possess both positives and negative values. There are various options known in the literature to define an intensity-based propagation term. Optionally, if the range of intensities of the model is given by $[I_L, I_H]$, the propagation term for a grid point x with intensity I(x) can be defined by the following intensity-based threshold function [8]:

$$V_t(x) = I_{width} - |I(x) - I_{mid}|,$$  Equation 2 where $I_{mid}$ and $I_{width}$ are the midpoint and half of the length of the intensity range for the model respectively, namely $$I_{mid} = \frac{I_L + I_H}{2} \text{ and } I_{width} = \left(\frac{I_H - I_L}{2}\right).$$

The result is positive velocities for grid points with intensities between $I_L$ and $I_H$ and negative velocities for grid points with intensities outside this range. Positive velocities tend to drive expansion outward while negative velocities drive it inward. Optionally, grid points for which $I(x)=I_{mid}$ get the highest positive velocity, which is $I_{width}$. Optionally, as intensity approaches the endpoints of the $[I_L, I_H]$ interval, the velocity becomes close to zero in a gradual manner based on the distance of I(x) from $I_{mid}$. Optionally, for intensities outside $[I_L, I_H]$ negative velocities are given based on their distance from this interval.

In some embodiments of the invention, both gradient and region intensity information are combined in the propagation speed term. Potentially, this makes the segmentation process more robust.

Application of the Level Set Paradigm

At blocks 502, 504, and 506, inputs are supplied. Inputs comprise, for example, a region of interest (2-D ROI or VOI) in an image, an initial segmentation seed inside it and a partial knowledge about the boundary of the anatomical structure of interest (optionally a lymph node). For a proper expansion of the segmentation, the input seed should be a true-planar object or a true-spatial one in a 2-D ROI or a 3-D VOI respectively. Pathological input seeds, like a line in 2-D space or a disk in 3-D space may not be expanded by the level set framework. Optionally, the partial knowledge about the lymph node's boundary can be, for example, the two endpoints of a given representative line segment of the lymph node in the process for segmenting its contour on a 2-D image (as depicted in FIG. 2) or the 2-D contour of the lymph node in the process for expanding it to a spatial segmentation (as depicted in FIG. 4).

At block 508, in some embodiments, image features of the lymph node are learned based on the given initial segmentation and a partial knowledge about the lymph node's boundary. Optionally, the expected range of intensities of the lymph node $[I_L, I_H]$ is determined based on intensity distribution statistics in the initial segmentation (mean, standard deviation and order statistics, for example). In some embodiments, the statistical cutoffs are defined to be relatively inclusive of low intensities, and relatively exclusive of high intensities. For example, if the initial segmentation is a small central seed inside the lymph node and the aim is to expand it (as done in block 210 of FIG. 2), then $I_L$ is defined, for example, as the minimum between 2.5 standard deviations below the mean and the 5% order statistics, while $I_H$ is defined as the maximum between 1.5 standard deviations above the mean and the 95% order statistics. In some embodiments, the standard deviations are chosen at another value, for example, a value within about ±20% of the values given for the standard deviations, and/or within about 4% of the order statistics given. This setting (which is relatively weak for inclusion of high intensities) provides a potential advantage derived from the core of a lymph node typically possessing the highest intensities, while intensities tend to diminish near the lymph node boundary. Conversely, the relatively strong inclusiveness of low intensities is less likely to cause problems (since intensities are likely to fall still lower in other tissues).

In contrast, if the initial segmentation is assumed to possess a large portion of the lymph node and the goal is to refine the segmentation on its boundary (as done at block

214 of FIG. 2), then the [$I_L$, $I_H$] range is set to be relatively smaller. For example, the range is set to be between 1.5 standard deviations below the mean and 0.5 standard deviations above the mean (an exemplary range of such selections is, for example, within about ±20% of the given standard deviations values). If the initial segmentation is a spatial seed that contains a main central planar contour of the lymph node (as described, for example, in relation to block 410 of FIG. 4), then the range is defined between 0.5 standard deviations below the mean and 1.5 standard deviations above it (an exemplary range of such selections is, for example, within about ±20% of the given standard deviations values). Optionally, for CT images, and the segmentation of, for example, lymph nodes, a range [$I_L$, $I_H$] is restricted to be between −100 HU and 200 HU, which are the known extreme values for lymph nodes in CT images (i.e. [$I_L, I_H$]⊆[−100,200]). In some embodiments, another range of HU values is used appropriate to the tissue type, for example, a range from −100-0 HU, −50-50 HU, 0-50 HU, 30-45 HU, 20-30 HU, 40-60 HU, 5-100 HU, 100-300 HU, or another range having the same, larger, smaller, and/or intermediate values.

As for gradient magnitudes: in some embodiments, the expected range of gradient magnitudes of the lymph node [$G_L$, $G_H$] is based on gradients found inside the initial segmentation, optionally also considering gradients found within available portions of the lymph node's boundary (for example, regions where the seed approaches the boundary, as described in relation to block 506). Optionally, the lowest value of the range is defined as the maximum between zero and 2.5 standard deviations below the mean inside the initial segmentation, while the highest value is defined as the minimum between 2.5 standard deviations above that mean and the lowest gradient magnitude on the given partial knowledge boundary of the lymph node. Optionally, variations of these values within a range of about ±0.4 standard deviations (or within another range having the same, larger, smaller, and/or intermediate bounds) are used.

At block 510, in some embodiments, one or more processed versions of the input image in the ROI (or VOI) are computed. Computed versions of the image define image-based velocities for driving the level set evolution. Optionally, two velocity maps are computed: an edge-based velocity map and an intensity-based velocity map.

In some embodiments, an edge-based map is computed based on the estimated range of gradient magnitudes for the lymph node [$G_L$, $G_H$], learned at block 508. Optionally, the range of gradient magnitudes in the image ROI is mapped into a new range [0,1] so that values smaller than $G_L$ are mapped to one, and values greater than $G_H$ are mapped to zero. Optionally, the mapping is performed by a Boltzmann Sigmoid function, such as that of Equation 1, for which the center c is the midpoint of the estimated range of gradient magnitudes for the lymph node (i.e. $c=((G_L+G_H)/2)$, and the slope s is proportional to the width of this range (e.g. $s=((G_L-G_H)/6)$). The result is a velocity map that potentially ensures that the segmentation's expansion will speed up in regions with gradient magnitudes that are similar to the ones found inside the initial lymph node segmentation, and will slow down on relatively strong edges that are potentially on the lymph node's boundary.

Figure 8A:
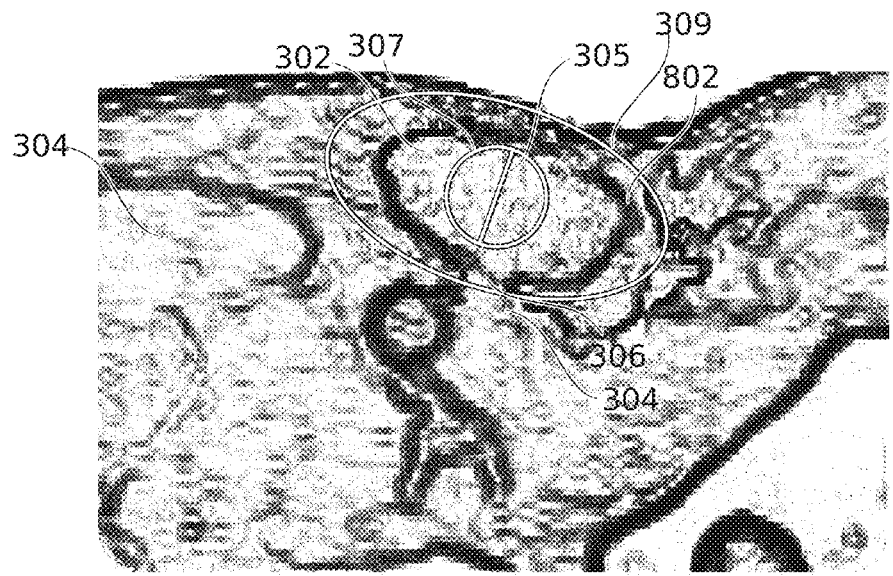
FIG. 8A illustrates an edge-map image based on the image of FIGS. 3A-3B, according to some exemplary embodiments of the invention.

Reference is now made to FIG. 8A, which illustrates an edge-map image based on the image of FIGS. 3A-3B, according to some exemplary embodiments of the invention.

The image of FIG. 8A illustrates an edge map constructed with regions of strong gradient relatively dark, and regions of weak gradient relatively light in shading. The lymph node 302, nearby tissue 304, representative line segment 305, 2-D seed ball 307, and ROI 309 are shown as for FIG. 3B, hereinabove.

In some embodiments of the invention, the relatively low-gradient interior of a lymph node is shown as a generally light-colored region (also region 302). The boundary of the lymph node is shown as a strong black contour 802. It should be noted that there is a region of relatively weaker, but still distinct edge at 306. Although the absolute intensity differences across this boundary are difficult to notice in the original intensity map, the border nevertheless appears in the edge map, allowing it to act as a constraint on seed expansion (velocity reduction).

In some embodiments, the intensity-based velocity map is defined based on the estimated range of intensities for the lymph node [$I_L$, $I_H$], that has been learned at block 508. The aim is to force the segmentation to expand in regions with intensities within this interval and to contract otherwise. Optionally, to define such velocities we use the $V_t(x)$ function of Equation 2. The absolute values of the velocities are then normalized into a new range [0,1], so that absolute velocity values greater than $I_{width}$ are mapped to one. Optionally, the normalization is performed by applying a Boltzmann Sigmoid function for which the center is $I_{width}/2$ and the slope is $I_{width}/6$. The result is the following velocity function:

$$V_{intensity}(x) = \text{sign}(V_t(x)) \cdot \frac{1}{1 + e^{3 - \frac{6|V_t(x)|}{I_{width}}}}, \quad \text{Equation 3}$$

where sign (·) is the sign function.

Figure 8B:
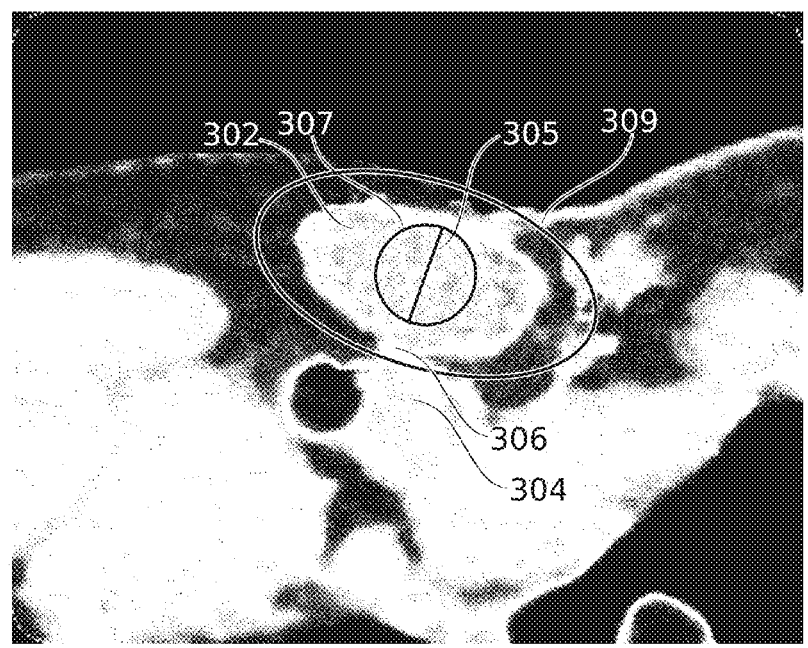
FIG. 8B illustrates an intensity-map image based on the image of FIGS. 3A-3B, according to some exemplary embodiments of the invention.

Reference is now made to FIG. 8B, which illustrates an intensity-map image based on the image of FIGS. 3A-3B, according to some exemplary embodiments of the invention.

The image of FIG. 8B illustrates an intensity map modified to reflect relative nearness (light colors) or distance (dark colors) from a mean value of intensities within the seed region 307. Thus, both some originally dark regions and some originally light regions are converted to dark regions in the image as shown. As applied to work as a velocity map, the new range of values can be normalized into a new range [−1, 1]. Optionally, the middle gray value could be considered as the zero point of the normalization mapping. The result is that the dark values would be mapped to negative velocities, and thus would tend to drive the expanding seed inward, while the light (positive) values would tend to drive the expanding seed outward. As depicted in FIG. 3A, the intensities of lymph node 302 are different than the intensities of the surrounding tissues. Thus, in FIG. 8B, most of the border between the lymph node and its surrounding comprises a sharp change between positive and negative values. However, there might be ambiguous regions, such as region 306. Segmentation leakage into these regions is largely controlled by other velocity terms of the expansion algorithm, such as the edge-mapped propagation and curvature terms.

Reference is again made to FIG. 5. At block 510, in some embodiments, all positive velocities beyond the ROI that drive the segmentation's boundary outwards, both in the edge-based and intensity-based maps, are set to zero. This ensures that the segmentation will not expand outside the ROI.

At block 512, in some embodiments, the level set function is initialized for time t=0 so that its zero level set is the boundary of the input segmentation.

At block 514, in some embodiments, the level set function is updated (iteratively, as represented by decision block 516) to model evolution over time. Optionally, the speed function comprises the propagation, curvature and advection terms, as described in the "General Features of the Level Set Paradigm" section. In some embodiments, the propagation term combines both gradient and region intensity information, calculated, for example, as described hereinabove.

In some embodiments of the invention, the propagation term is defined as a linear combination of the edge-based and intensity-based velocities computed at block 510. Optionally, the two scalar weights that define their relative influence are optionally specified as 0.3 and 0.7 respectively. Optionally, the edge-based velocity weight is in a range between 0.25 and 0.35 and the intensity-based velocity weight is in a range between 0.65 and 0.75 respectively. In some embodiments, the relative scalar weights are specified in another ratio, for example a ratio in a range between about 0.25:0.75 and about 0.35:0.65, about 0.2:0.8 and about 0.4:0.6, about 0.1:0.9 and about 0.5:0.5, or another ratio having the same, larger, smaller, and/or intermediate bounds.

In some embodiments, three weights control the relative contribution of the total propagation, curvature and advection terms. Optionally, these weights are defined as 0.7, 0.15 and 0.15 respectively. Optionally, the propagation term weight and the curvature term weight are specified in another ratio, for example, a ratio in a range between about 0.65:0.175 and about 0.75:0.125, about 0.6:0.2 and about 0.8:0.1, about 0.5:0.25 and about 0.9:0.05, or another ratio having the same, larger, smaller, and/or intermediate bounds. Optionally, the propagation term weight and the advection term weight are specified in another ratio, for example, a ratio in a range between about 0.65:0.175 and about 0.75:0.125, about 0.6:0.2 and about 0.8:0.1, about 0.5:0.25 and about 0.9:0.05, or another ratio having the same, larger, smaller, and/or intermediate bounds. Optionally, the curvature term weight and the advection term weight are specified in another ratio, for example, a ratio in a range between about 0.75:1 and about 1:0.75, about 0.5:1 and about 1:0.5, about 0.33:1 and about 1:0.33, or another ratio having the same, larger, smaller, and/or intermediate bounds. Correct lymph node segmentation evolution depends upon appropriate selection of these three weights, as well as on the weights of the two propagation velocities.

Between blocks 514 and 516, in some embodiments, update of the level set function is optionally repeated until some convergence criterion is satisfied, and/or until a predefined maximal number of iterations is reached (for example, 400 iterations). Optionally, the level set evolution is considered to have converged if the root mean square (RMS) of the level set change on the discrete zero level set layer is below some predefined threshold (e.g. 0.001).

At block 518, in some embodiments, the iterative process has ended. The final zero level set is extracted as the interface between the evolved segmentation and its surrounding. In a typical instance, the zero level properly represents the boundary of the segmented lymph node. Potentially, however, there are cases where some of its grid points belong to adjacent tissues. For example, in the sparse implementation [6], some of the grid points on the zero level set might be considered on this layer, not due to their image attributes, but due to the attributes of an adjacent grid point.

In an example, a lymph node is depicted on a 3-D medical image with a large z-mm per pixel. Potentially, due to the large z-mm per pixel, edges between the lymph node and its surrounding might not be captured on the two extremal slices of the lymph node. Upon algorithm iteration for segmenting the lymph node, the zero level set will reach these extremal slices. Voxels of the lymph node on these slices will most likely get high intensity-based velocities, since they are entirely interior to the lymph node. As a result of a "momentum" imparted by these velocities, adjacent voxels on the nearby slices, but outside the lymph node, will potentially be within the zero level set in the next iteration of the algorithm, regardless of their intensity.

In some embodiments, this problem is addressed with heuristics. For example, at block 518, when the level set process ends, grid points on the zero level set are verified to be part of the segmented lymph node based on some criteria. Optionally, only grid points on the zero level set that satisfy at least one of the following two conditions are considered to be part of the segmentation boundary: (i) the total force for the grid point is non-negative and higher than a predefined threshold, or (ii) the number of neighboring grid points that are entirely interior to the segmentation (e.g. on negative layers in the sparse implementation) is above some predefined threshold (e.g. at least two neighbors). Optionally, the final set of verified grid points of the segmentation boundary and the grid points enclosed by this set (e.g. grid points on negative layers in the sparse implementation) form the resulting segmentation.

Iterative Segmentation

Reference is now made to FIG. 9, which is a schematic flowchart illustrating iterative application of a segmentation algorithm, according to some exemplary embodiments of the invention.

In general, the constraints and assumptions described in relation to methods of the current invention are readily met within ordinary current practice, and allow segmentation of a lymph node to proceed in one iteration of the algorithm to produce a useful result. For example, the parameters and/or approaches of the method have been chosen to be potentially robust to user variability in the selection of an initial 2-D plane and/or a representative line segment, including normal variability due to lymph node orientation, shape, and/or imaging noise.

Nevertheless, in some embodiments, for example as described, for example, in connection with blocks 104 and 106 of FIG. 1B, and blocks 204 and 208 of FIG. 2, a lymph node segmentation algorithm is iterated a plurality of times, according to a corresponding plurality of initial conditions. Optionally, this is performed so that assumptions of the initial conditions provided as input to the algorithm can be confirmed, refined, and/or corrected.

At block 902, in some embodiments, initial segmentation conditions are provided. In some embodiments, the conditions of the initial inputs are lacking, and/or potentially lacking, in one or more aspects that the segmentation algorithm directly or indirectly uses.

The method of FIG. 9 is optionally used, for example, when one or more of the following conditions potentially applies and/or is to be accounted for.

- Only one point is provided, rather than two points defining a representative line segment.
- The representative line segment might not fully extend between two boundaries of the lymph node in the section selected.
- The section on which the representative line segment (or other starting data) is provided might not be sufficiently central, and/or the lymph node is irregularly shaped.
- The section on which the representative line segment (or other starting data) is provided might not be sufficiently near to the centroid of the lymph node.

In some embodiments, there is no missing, incorrect, or partial initial information expected, but variation of the initial conditions allows verification of the segmentation result's insensitivity to the specifics of the initial conditions.

Where initial conditions are missing, the missing information is supplied by an initial estimate, for example as described in relation to FIGS. 1A and 2 hereinabove. An initial estimate is optionally based on, for example:

- inspection of the available input parameters (for example, inspection of a single 2-D frame for boundaries surrounding an input point);
- a priori assumptions (for example, a ROI that is set to a predefined area that is larger than any lymph node is likely to be); and/or
- exploration of a large number of different parameter possibilities (for example, a first out of several choices for a direction of an axis of the lymph node).

In some embodiments, a zone of consistency defined by a group of similar initial conditions is located, throughout which incremental changes of initial conditions nevertheless produce substantially the same output segmentation. Given that the initial conditions explored are sufficiently near to the unknown "correct" (or best available) initial conditions, finding a zone of consistency is potential evidence of a correct segmentation having been found.

More generally, where availability of computational resources permits, it is a potential advantage to "walk through" the space of possible inputs in this fashion, by running these inputs through a corresponding plurality of iterations of the algorithm. The runs can be guided, in some embodiments, by previous iterations, and/or, in some embodiments, run separately. This approach can help resolve ambiguities and/or missing information, find potential problems in the initial conditions provided (the problems optionally being susceptible to repair, and/or to reporting to the user), and/or allow relaxation of the constraints placed on the conditions of initial input.

At block 904, in some embodiments, segmentation is performed, for example as described in FIG. 1B and other figures hereinabove.

At block 906, in some embodiments, one or more of the segmentations already performed are optionally evaluated. Potentially, more than one such segmentation is available, as a result of a decision to iterate at block 908, adjustment of input conditions at 910, and redetermination of the segmentation at block 904.

Evaluation of the segmentation can take one of several forms. In some embodiments, a brute-force style search of a parameter space is performed. Optionally, in such a case, there is no intermediate evaluation of segmentations, which is postponed until the end of the search. Adjustment of conditions at block 910 comprises selecting the next predetermined set of input conditions to evaluate.

In some embodiments, evaluation of the segmentation takes the form of a comparison among segmentations. For example, where conditions are adjusted to achieve a segmentation by gradient descent, the segmentations are evaluated for a change in segmented volume, with the determination of a sub-threshold change indicating that iteration is no longer necessary (as determined at block 908). Otherwise, in the adjustment of the conditions at block 910, parameters are changed according to known methods of gradient descent, based, for example, on a correspondence between volume result and parameters that maximizes a weighted scoring function comprising, for example, lymph node volume, non-lymph node volume enclosed by the ROI and/or VOI, and/or variation of lymph node volume as a function of some parameter such as orientation or axis length.

In some embodiments, evaluation of the segmentation is against another criterion. For example, a segmentation that yields boundaries within the seed, abutting or outside a ROI or VOI, or otherwise displaying evidence of "pathology" relative to the assumptions and expectations of the algorithm is treated as defective. In a more particular example, a pathological case is defined if a segmentation boundary is found within one, two or another number of grid spacing distances of a ROI or VOI boundary over a continuous extent comprising several percent of the ROI or VOI boundary. This is potential evidence that the segmentation may have omitted some part of the anatomical structure (beyond the ROI or VOI) or that the algorithm has missed the actual boundaries of the anatomical structure.

In the corresponding adjustment of conditions at block 910, the defect is optionally remedied by changing the size, location, and/or orientation of the seed, ROI, and/or VOI. Optionally, the change is guided by the details of the defect—for example, the ROI is expanded on a side where a boundary found to unexpectedly coincide with the bounding volume of the anatomical structure. Optionally, the change is more simply to make the ROI "bigger" or "smaller", to select a different 2-D plane, or simply to make a trial of a different initial condition. Optionally, new input conditions are requested.

At block 912, in some embodiments, segmentations are optionally evaluated after a plurality of segmentations has been generated. Optionally, this is where evaluation occurs after brute force generation of a number of segmentation results. For example, to find the "best" representative line segment, there is optionally an evaluation of the volume found upon using some predetermined number of representative line segments of different orientations and/or lengths. In some embodiments, a line segment is chosen that results in a volume determination that falls within a population of similar volume determinations out of the segmentations available.

In some embodiments, at block 912, the evaluation comprises combinations of one or more segmentations. For example, a plurality of segmentations are averaged together, and/or segmentation results are reported, for example, as a statistical profile of a mean volume with one or more optional statistical measures (such as standard deviation) provided besides.

At block 914, the final segmentation is provided.

It is expected that, during the life of a patent maturing from this application, relevant imaging technology will be developed and the scope of the term imaging technologies is intended to include all such new technologies a priori.

As used herein, the term "about" refers to within ±10%.

The terms "comprises", "comprising", "includes", "including", "having" and their conjugates mean: "including but not limited to".

The term "consisting of" means: "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The words "example" and "exemplary" are used herein to mean "serving as an example, instance or illustration". Any embodiment described as an "example" or as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features except insofar as such features conflict.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

REFERENCES

[1] E. A. Eisenhauer, P. Therasse, J. Bogaerts et al. (2009), New response evaluation criteria in solid tumours: Revised RECIST guideline (version 1.1), Eur J Cancer, 45: 228-247.

[2] L. H. Schwartz, J. Bogaerts, R. Ford et al. (2009). Evaluation of lymph nodes with RECIST 1.1, Eur J Cancer, 45:261-267.

[3] J. A. Sethian (2003). Level Set Methods and Fast Marching Methods: Evolving Interfaces in Computational Geometry, Fluid Mechanics, Computer Vision, and Materials Science, Cambridge University Press, Cambridge, UK.

[4] P. Perona and J. Malik (1990). Scale-space and edge detection using anisotropic diffusion, IEEE Transactions on Pattern Analysis and Machine Intelligence, 12 (7): 629-639.

[5] D. Adalsteinsson and J. A. Sethian (1995). A fast level set method for propagating interfaces, Journal of Computational Physics, 118(2): 269-277.

[6] R. T. Whitaker (1998). A Level-Set Approach to 3D Reconstruction from Range Data, International Journal of Computer Vision, 29 (3): 203-231.

[7] R. Malladi, J. A. Sethian, B. C. Vemuri (1995). Shape modeling with front propagation: a level set approach, IEEE Trans. Pattern Anal. Mach. Intell. 17(2): 158-175.

[8] A. E. Lefohn, J. M. Kniss, C. D. Hansen and R. T. Whitaker (2004). A streaming narrow-band algorithm: Interactive computation and visualization of level sets, IEEE Transactions on Visualization and Computer Graphics, 10:422-433.

What is claimed is:

1. A method of spatially segmenting an anatomical structure from 3-D medical image data, comprising:
   receiving the 3-D medical image data, and a plurality of grid locations from within a section of the 3-D medical data, the section including a sub-portion of the anatomical structure;
   determining a first seed selection, based on the grid locations and the section;
   determining a 2-D or thin slab-like region of interest having a 2-D shape, including the first seed selection, from the grid locations and from an expected maximum aspect ratio of the anatomical structure, selected so that the interior of the shape will include all of the anatomical structure appearing in the section within the region of interest;
   determining a partial segmentation of the anatomical structure within the section, based on the first seed selection, comprising moving a boundary of the first seed selection outward from an initial position of the first seed selection boundary, the boundary constrained to remain within the region of interest, and excluded from locations outside the region of interest;

determining a second seed selection, based on the location of the partial segmentation within the 3-D medical image data; and determining a 3-D segmentation of the anatomical structure, based on the second seed selection and the 3-D medical image data.

2. The method of claim 1, wherein the sub-portion is a 2-D slice of the 3-D medical data.

3. The method of claim 2, wherein the partial segmentation is a 2-D segmentation.

4. The method of claim 1, wherein the anatomical structure comprises a lymph node.

5. The method of claim 1, wherein the partial segmentation comprises the boundary of the sub-portion of the anatomical structure.

6. The method of claim 1, wherein moving of the first seed selection boundary is based on intensity values within the 3-D medical data.

7. The method of claim 6, wherein a range of the intensity values over which outward movement of the first seed selection boundary occurs is limited to be between about −100 HU and 200 HU.

8. The method of claim 1, wherein moving of the first seed selection boundary is based on at least one of intensity values and intensity gradient values within the 3-D medical data.

9. The method of claim 1, wherein the 2-D shape of the region of interest comprises two axes defining parameters of a closed curve, each axis having a length selected so that the interior of the closed curve includes all of the anatomical structure appearing in the section within the region of interest.

10. The method of claim 1, wherein the determining of a 3-D segmentation comprises moving a boundary of the second seed selection outward in three dimensions from an initial position of the second seed selection boundary.

11. The method of claim 10, wherein moving of the second seed selection boundary is based on at least one of intensity values and intensity gradient values within the 3-D medical data.

12. The method of claim 10, wherein a range of intensity values over which outward movement of the second seed selection boundary occurs is limited to be between −100 HU and 200 HU.

13. The method of claim 10, wherein movement of the boundary is confined to be within a 3-D volume of interest.

14. The method of claim 13, wherein the 3-D volume of interest comprises three axes defining parameters of the volume, each axis and its length selected such that the volume includes all of the anatomical structure appearing in the 3-D medical image data.

15. The method of claim 1, wherein the determining of the first seed selection comprises defining a 2-D boundary of the first seed.

16. The method of claim 1, wherein the determining of the partial segmentation of the anatomical structure comprises refining the partial segmentation to exclude regions near a boundary of the partial segmentation based on at least one of a criterion of shape and a criterion of intensity in the section of the 3-D medical data.

17. A computer software product, comprising a non-transitory computer-readable storage medium in which program instructions are stored, which instructions, when read by a computer, cause the computer to receive 3-D medical image data and execute the method according to claim 1.

18. A system for spatially segmenting an anatomical structure from 3-D medical image data, comprising an imaging station comprising: non-transitory computer readable storage media storing computer program instructions for performing the method of claim 1; a network connection for receiving the 3-D medical image data and storing the data in the non-transitory computer readable storage media; a user input device for receiving grid locations from a user and storing them as data in the non-transitory computer readable storage media; and a processor that executes the computer program instructions stored in the non-transitory computer readable storage media using the image data and the grid locations data stored in the non-transitory computer readable storage media.

19. The method of claim 9, wherein a first one of the two axes is determined from the grid locations, and a second one of the two axes is determined from the first one of the axes and the expected maximum aspect ratio of the anatomical structure.

20. The method of claim 14, wherein the three axes and their lengths are determined by the region of interest of the section, and by the expected maximum aspect ratio of the anatomical structure.

* * * * *